US012122722B2

(12) United States Patent
Hariharan et al.

(10) Patent No.: US 12,122,722 B2
(45) Date of Patent: Oct. 22, 2024

(54) SYSTEMS AND METHODS FOR STORING AND MINERALIZING CARBON DIOXIDE WITH LIME

(71) Applicant: GRAYMONT WESTERN CANADA INC., Richmond (CA)

(72) Inventors: Narain Hariharan, Edmonton, UT (US); Michael John Tate, Oregon, OH (US); Nikolas Andrei Romaniuk, Edmonton (CA)

(73) Assignee: GRAYMONT WESTERN CANADA INC., Richmond (CA)

( * ) Notice: Subject to any disclaimer, the term of this patent is extended or adjusted under 35 U.S.C. 154(b) by 0 days.

(21) Appl. No.: 18/390,399

(22) Filed: Dec. 20, 2023

(65) Prior Publication Data

US 2024/0199493 A1 Jun. 20, 2024

Related U.S. Application Data

(60) Provisional application No. 63/510,595, filed on Jun. 27, 2023, provisional application No. 63/504,974, filed on May 30, 2023, provisional application No. 63/476,348, filed on Dec. 20, 2022.

(51) Int. Cl.

| | |
|---|---|
| ***C04B 14/14*** | (2006.01) |
| ***C04B 14/28*** | (2006.01) |
| ***C04B 18/08*** | (2006.01) |
| ***C04B 18/14*** | (2006.01) |
| ***C04B 28/10*** | (2006.01) |
| ***C04B 28/12*** | (2006.01) |
| ***C04B 40/02*** | (2006.01) |
| ***C09K 17/10*** | (2006.01) |
| *C04B 111/00* | (2006.01) |

(52) U.S. Cl.

CPC .............. *C04B 28/12* (2013.01); *C04B 14/14* (2013.01); *C04B 14/28* (2013.01); *C04B 18/08* (2013.01); *C04B 18/141* (2013.01); *C04B 28/10* (2013.01); *C04B 40/0231* (2013.01); *C09K 17/10* (2013.01); *C04B 2111/00017* (2013.01); *C04B 2111/00732* (2013.01); *C04B 2201/50* (2013.01); *Y02P 40/18* (2015.11)

(58) Field of Classification Search

CPC ......... C04B 28/12; C04B 14/14; C04B 14/28; C04B 40/0231; C04B 2111/00017; C04B 2111/00732; C04B 2201/50; C04B 28/10; C04B 14/04; C04B 14/26; C04B 2111/00; C04B 2111/00474; C04B 18/08; C04B 18/141; C09K 17/10; Y02C 20/40; Y02C 20/00; Y02P 40/18

See application file for complete search history.

(56) References Cited

U.S. PATENT DOCUMENTS

| | | | |
|---|---|---|---|
| 2,669,542 A | 2/1954 | Dooley | |
| 3,074,860 A | 1/1963 | Shinzoh | |
| 3,861,928 A | 1/1975 | Slater | |
| 4,196,068 A | 4/1980 | Scoville | |
| 4,654,135 A | 3/1987 | Yamamoto | |
| 4,749,453 A | 6/1988 | Harris | |
| 5,572,938 A | 11/1996 | Leger | |
| 5,853,685 A | 12/1998 | Erickson | |
| 7,534,411 B2 | 5/2009 | Shapira et al. | |
| 7,993,500 B2 | 8/2011 | Gilliam et al. | |
| 8,357,270 B2 | 1/2013 | Gilliam et al. | |
| 9,200,375 B2 | 12/2015 | Gilliam et al. | |
| 9,297,082 B2 | 3/2016 | Licht | |
| 9,718,731 B2 | 8/2017 | Bullerjahn et al. | |
| 2008/0124269 A1 | 5/2008 | Daudey | |
| 2008/0245660 A1 | 10/2008 | Little et al. | |
| 2010/0068109 A1* | 3/2010 | Comrie | B01D 53/62 423/220 |
| 2010/0101955 A1 | 4/2010 | Nocera et al. | |
| 2010/0154593 A1 | 6/2010 | Ralchev et al. | |
| 2011/0044882 A1 | 2/2011 | Buckley et al. | |
| 2011/0182786 A1 | 7/2011 | Burba | |
| 2012/0121491 A1 | 5/2012 | Rau | |
| 2013/0112115 A1 | 5/2013 | Sotillo et al. | |
| 2014/0010743 A1 | 1/2014 | Kosmoski | |

(Continued)

FOREIGN PATENT DOCUMENTS

| | | | |
|---|---|---|---|
| CN | 108117356 A * | 6/2018 | C04B 28/143 |
| CN | 114954785 A | 8/2022 | |

(Continued)

OTHER PUBLICATIONS

CN-108117356-A, machine translation (Year: 2018).*

Geology. Limestone [retrieved from the internet at May 2, 2024 from <URL:https://geology.com/rocks/limestone.shtml> and wayback machine at <URL:https://web.archive.org/web/20211015232211/https://geology.com/rocks/limestone.shtml>] (Year: 2021).*

[No Author Listed], LumiShield Chemistry. LumiShield Technologies, Inc. Pittsburgh, PA Accessed Oct. 15, 2021 as available Jan. 31, 2019 from https://web.archive.org/web/20190131025944/http://lumishieldtech.com/chemistry .html. 1 page.

(Continued)

*Primary Examiner* — Anthony J Green
*Assistant Examiner* — Marites A Guino-O Uzzle
(74) *Attorney, Agent, or Firm* — Perkins Coie LLP

(57) ABSTRACT

Methods and systems for storing and mineralizing carbon dioxide in soil are disclosed herein. In some embodiments, the method comprises adding lime and carbon dioxide to a soil column including soil to form treated soil. After adding the lime and carbon dioxide, the method also includes strengthening the treated soil in the soil column by mineralizing the lime and carbon dioxide in the soil column. The method can further include adding a binder to the soil column and mixing the binder with the soil, lime, and carbon dioxide. The binder can include, for example, pozzolan, cement, cementitious material, and/or a manufactured calcium carbonate product.

15 Claims, 6 Drawing Sheets

(56) References Cited

U.S. PATENT DOCUMENTS

| | | | | |
|---|---|---|---|---|
| 2015/0343373 | A1 | 12/2015 | Balfe et al. | |
| 2016/0137551 | A1 | 5/2016 | Le Gouil et al. | |
| 2017/0022110 | A1 | 1/2017 | Ulrike et al. | |
| 2018/0305254 | A1 * | 10/2018 | Ben Haha | C04B 7/153 |
| 2019/0040347 | A1 | 2/2019 | Kim et al. | |
| 2021/0179492 | A1 | 6/2021 | Hoffmann | |
| 2022/0017419 | A1 | 1/2022 | Guynn | |
| 2022/0064063 | A1 | 3/2022 | Chiang et al. | |
| 2022/0145477 | A1 | 5/2022 | Chiang et al. | |
| 2023/0036470 | A1 | 2/2023 | Finke et al. | |
| 2023/0174396 | A1 | 6/2023 | Chiang et al. | |
| 2023/0271882 | A1 * | 8/2023 | Sperry, III | B01D 53/82 106/696 |
| 2023/0313386 | A1 | 10/2023 | Ellis et al. | |
| 2023/0330724 | A1 | 10/2023 | Chiang | |

FOREIGN PATENT DOCUMENTS

| | | | | |
|---|---|---|---|---|
| EP | 2816140 | A1 | 12/2014 | |
| GB | 1008196 | A | 10/1965 | |
| JP | 2007177586 | A | 7/2007 | |
| JP | 2019163623 | A | 9/2019 | |
| WO | 2008124538 | A1 | 10/2008 | |
| WO | 2012142547 | A1 | 10/2012 | |
| WO | 2014092667 | A1 | 6/2014 | |
| WO | 2018087697 | A1 | 5/2018 | |
| WO | WO-2018078672 | A1 * | 5/2018 | C04B 28/12 |
| WO | 2019133702 | A1 | 7/2019 | |
| WO | 2020150449 | A1 | 7/2020 | |
| WO | 2020186178 | A1 | 9/2020 | |
| WO | 2021030529 | A1 | 2/2021 | |
| WO | 2021222585 | A1 | 11/2021 | |
| WO | 2022020470 | A1 | 1/2022 | |
| WO | 2022020572 | A1 | 1/2022 | |
| WO | 2022204059 | A1 | 9/2022 | |
| WO | 2022216741 | A1 | 10/2022 | |
| WO | 2022221334 | A1 | 10/2022 | |
| WO | 2023108054 | A1 | 6/2023 | |
| WO | 2023150796 | A1 | 8/2023 | |
| WO | 2023250495 | A1 | 12/2023 | |
| WO | 2024059557 | A1 | 3/2024 | |

OTHER PUBLICATIONS

[No Author Listed], Mineral Commodity Summaries. U.S. Department of the Interior, U.S. Geological Survey. Jan. 2018. 204 pages.

[No Author Listed], Mini Chlor Alkali Plant. SkidPlant. Chenai, India. Accessed Oct. 15, 2021 as available Jan. 10, 2019 from https://web.archive.org/web/20190110233048/http://www.skidplant.com/mini-chlor-alkali-plant 3 pages.

[No Author Listed], Renewable Power Generation Costs in 2017. International Renewable Energy Agency (IRENA), Abu Dhabi. 2018. 160 pages.

Alonso et al., (2001). "Alkaline activation of metakaolin and calcium hydroxide mixtures: influence of temperature, activator concentration and solids ratio," Materials Letters 47: 55-62.

Azo Materials. (2024). Silica-Silicon Dioxide (SiO2) retrieved from the internet on Mar. 6, 2024 from <https://www. azom.com/article.aspx? ArticleID=1114> 5 pages.

Barker et al., CO2 Capture in the Cement Industry. IEA Greenhouse Gas R&D Programme. Cheltenham, Glos., UK. 2008; 1-221.

Belevi et al., Factors Determining the Element Behavior in Municipal Solid Waste Incinerators. 1. Field Studies. Environ. Sci. Technol. May 12, 2000;34(12):2501-2506.

Bioworld. (2016). "Safety Data Sheet, Calcium Chloride Dihydrate," retrieved from the internet on Mar. 6, 2024 from <https:// www. bio-world.com/site/accounts/masterfiles/M S DS/M S-40300016. pdf> 8 pages.

Bjerge et al., CO2 Capture in the Cement Industry, Norcem CO2 Capture Project (Norway). Energy Procedia. 2014;63:6455-63.

Blunt et al., Carbon Dioxide in Enhanced Oil Recovery. Energy Convers. Mgmt. 1993;34(9-11 ):1197-1204.

Carrasco-Maldonado et al., Oxy-fuel combustion technology for cement production—State of the art research and technology development. International Journal of Greenhouse Gas Control. 2016:45: 189-99. Epub Jan. 4, 2016.

Chen et al., (2009). "Incorporation of waste materials into portland cement clinker synthesized from natural raw materials," J Mater Sci 44: 2617-2627.

Chen et al., Environmental impact of cement production: detail of the different processes and cement plant variability evaluation. Journal of Cleaner Production. 201O;18(5):478-485. Epub Jan. 4, 2010.

Davis et al., Net-zero emissions energy systems. Science. Jun. 29, 2018; 360(6396) 9 pages. Supplementary Material included. 27 pages total.

Delgado et al., CO2 Balance in a Compression and Purification Unit (CPU). Energy Procedia. 2014; 63:322-31.

Dowling et al., Lime in the limelight. Journal of Cleaner Production. 2015;92:13-22. Epub Dec. 20, 2014.

Dubois et al., Study of the post-combustion CO2 capture applied to conventional and partial oxy-fuel cement plants. Energy Procedia. 2017; 114:6181-96.

Ellis et al. (2020). "Toward Electrochemical Synthesis of Cement—An Electrolyzer-Based Process for Decarbonating:;aCO3 While Producing Useful Gas Streams," PNAS 117(23): 12584-12591.

Encyclopedia Britannica. (2016). "Sedimentary rock," retrieved from the internet on Mar. 7, 2024 from <https://www. britannica. com/science/sedimentary-rock/ Limestones-and-dolomites and wayback https://web.archive.org/ web/20160420201820/https://www_britannica. com/science/ sedimentary-rock/Limestones-and-dolomites> 1 page.

Free, M.L., Hydrometallurgy—Fundamentals and Applications. 2013. John Wiley & Sons, Inc. 451 pages.

Funari et al., Solid residues from Italian municipal solid waste incinerators: A source for ""critical"" raw materials. Waste Manag. Nov. 2015; 45:206-16. Epub Dec. 12, 2014. Pre-publication version provided. 11 pages.

Gardarsdottir et al., Comparison of Technologies for CO2 Capture from Cement Production—Part 2: Cost Analysis. Energies. Feb. 10, 2019;12(3):1-20.

Geels et al., Sociotechnical transitions for deep decarbonization. Science. Sep. 22, 2017;357(6357): 1242-1244.

Gray, H.B., Powering the planet with solar fuel. Nature Chemistry. Mar. 19, 2009;1:7; 2 pages.

Haruta et al., Catalytic Combustion of Hydrogen I—Its Role in Hydrogen Utilization System and Screening of Catalyst Materials. Int. J. Hydrogen Energy. 1981;6(6):601-8.

Hasanbeigi et al., Emerging energy-efficiency and CO2 emission-reduction technologies for cement and concrete production: A technical review. Renewable and Sustainable Energy Reviews. Aug. 30, 2012;16(8):6220-6238.

Ibrahim et al., (2018). "Metakaolin as an Active Pozzolan for Cement That Improves Its Properties and Reduces Its Pollution Hazard," Journal of Minerals and Materials Characterization and Engineering 6: 86-104.

Imbabi et al., Trends and developments in green cement and concrete technology. International Journal of Sustainable Built Environment. 2012;1:194-216. doi: 10.1016/i.lisbe.2013.05.001.

Irabien et al., (1990). "Thermal Dehydration of Calcium Hydroxide. 1. Kinetic Model and Parameters," Ind. Eng. Chem. Res. 29(8): 1599-1606.

Janssen, G.J.M., Modelling study of CO2 poisoning on PEMFC anodes. Journal of Power Sources. Jul. 3, 2004;136:45-54.

Joseph et al., The Use of Municipal Solid Waste Incineration Ash in Various Building Materials: A Belgian Point of View. Materials. Jan. 16, 2018; 11(141): 1-30.

Keith et al., A Process for Capturing CO2 from the Atmosphere. Joule. Aug. 15, 2018;2(8): 1573-94.

Kelly et al., Historical Statistics for Mineral and Material Commodities in the United States, US Geological Survey. Reston, VA Accessed Jan. 7, 2009 as updated Apr. 17, 2008 from http://minerals. usga.gov/ds/2005/140/. 8 pages.

Lassagne et al., Techno-economic study of CO2 capture for aluminum primary production for different electrolytic cell ventilation rates. Chemical Engineering Journal. Jun. 26, 2013;230:338-50.

(56) References Cited

OTHER PUBLICATIONS

Lawal et al., Dynamic modelling and analysis of post-combustion CO2 chemical absorption process for coal-fired power plants. Fuel. Jun. 2, 2010;89(10):2791-2801.
Lehne et al., Making Concrete Change; Innovation in Low-carbon Cement and Concrete. Chatham House, London, UK. Jun. 2018. 138 pages.
Li et al., Greenhouse Gas Emissions, Energy Efficiency, and Cost of Synthetic Fuel Production Using Electrochemical CO2 Conversion and the Fischer-Tropsch Process. Energy Fuels. Jun. 1, 2016 ;30(7):5980-9.
Licht et al., STEP Cement: Solar Thermal Electrochemical Production of Cao without CO2 emission. Chem. Commun. 2012;48:6019-6021. doi: 10.1039/c2cc31341c.
Licht, "Co-Production of Cement and Carbon Nanotubes with a Carbon Negative Footprint," Journal of CO2 Utilization, Aug. 2016. Accessed online at on Jan. 14, 2019.
Liu et al., Experimental study on improving cement quality with oxygen enriched combustion technology. IOP Conf. Series: Materials Science and Engineering. 2015;103:1-7.
Madrid et al., Synthesis and morphological examination of high-purity Ca(OH)2 nanoparticles suitable to consolidate porous surfaces. Applied Surface Science. 2017;424:2-8. Epub Mar. 27, 2017.
Marin et al., Simulating the Impact of Oxygen Enrichment in a Cement Rotary Kiln Using Advanced Computational Methods. Combust. Sci. and Tech. 2001;164:193-207.
Mascolo et al., Influence of Polymorphism and Stabilizing Ions on the Strength of Alite. Journal of the American Ceramic Society—Discussion and Notes. Apr. 1973;56(4):222-3.
Mirghiasi et al., (2014), "Preparation and characterization of Cao nanoparticles from Ca(OH)2 by direct thermal decomposition method," Journal of Industrial and Engineering Chemistry 20: 113-117.
Mitlitsky et al. (1998). "Regenerative Fuel Cell Systems," Energy & Fuels 12:56-71.
Morf et al., Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33 (6):1573.
Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.
Odler et al., Polymorphism and Hydration of Silicate Silicate Doped With ZnO. Journal of the American Ceramic Society. Jan. 1983;66(1):I-4.
Rau (2009). "Electrochemical CO2 capture and storage with hydrogen generation," Energy Procedia 1: 823-828.
Rau, "Electrochemical Splitting of Calcium Carbonate to Increase Solution Alkalinity: Implications for Mitigation of Carbon Dioxide and Ocean Acidity," Environ. Sci. Technol.; vol. 42; 2008; pp. 8935-8940.
Rau, CO2 Mitigation via Capture and Chemical Conversion in Seawater. Environ. Sci. Technol. 2011 ;45(3): 1088-1092.
Schmidt et al., Future cost and performance of water electrolysis: An expert elicitation study. International Journal of Hydrogen Energy. Nov. 22, 2017;42(52):30470-92.
Stevula et al., Hydration of Polymorphic Modification C3S. Cement and Concrete Research. 1981 ;11(2): 183-190.
Sutkovic. (2014). "Ionic Chemical Equations," retrieved from the internet on Mar. 6, 2024 from <https://www.ius.edu.ba/ common/ 2014SpringChemistryProblemSample1.pdf> 3 pages.
Syc et al., Metal recovery from incineration bottom ash: State-of-the-art and recent developments. J Hazard Mater. Jul. 5, 2020;393:1-17. Epub Feb. 29, 2020.
Taylor, Cement chemistry, 2nd edition. 1997. Thomas Telford Publishing. London, UK. 470 pages.
Topham et al., Carbon Dioxide. Ullmann's Encyclopedia of Industrial Chemistry. Wiley-VCH. May 2014:1-43.
Traynor et al., Dissolution of olivines from steel and copper slags in basic solution. Cement and Concrete Research. Jul. 2020;133: 106065. Author manuscript provided. 33 pages.
Voldsund et al., Comparison of Technologies for CO2 Capture from Cement Production—Part 1: Technical Evaluation. Energies. Feb. 12, 2019;12:559. 33 pages.
Yao et al., Mobility of heavy metals and rare earth elements in incineration bottom ash through particle size reduction. Chemical Engineering Science. Oct. 18, 2014;18:214-220.
Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.
Zeman, Oxygen combustion in cement production. Energy Procedia. 2009;1:187-94.
International Search Report and Written Opinion for International App. No. PCT/US2023/085160; Date of Filing: Dec. 20, 2023; Applicant: Graymont Western Canada Inc.; Date of Mailing: May 1, 2024, 11 pages.

* cited by examiner

| Binder | Baseline | Sample 1 | Sample 2L | Sample 2U | Sample 3L | Sample 4U | Sample 4L | Sample 4U | Sample 5L | Sample 5U |
|---|---|---|---|---|---|---|---|---|---|---|
| Cement | 100% | 99.60% | 97% | 93.50% | 87% | 74% | 50% | 35% | 24% | 0% |
| Lime | 0% | 0% | 1.7% | 3.70% | 5.20% | 8.20% | 3.7% | 8.2% | 8.2% | 12.7% |
| Pozzolan | 0% | 0% | 0% | 0% | 5% | 15% | 0% | 15% | 15% | 30% |
| Manufactured Calcium Carbonate | - | - | - | - | - | - | 43.5% | 39% | 50% | 54.5% |
| $CO_2$ | 0% | 0.40% | 1.30% | 2.80% | 2.80% | 2.80% | 2.8% | 2.8% | 2.8% | 2.8% |
| **D28 Strength** | X | ~X | ~X | 1.05-1.2X | ~X | 0.8-0.9X | X | 0.8-1.0X | ~X | 0.8-1.0X |
| **Est. GHG** | Z | 0.99Z | 0.97Z | 0.94Z | 0.90Z | 0.82Z | 0.62Z | 0.54Z | 0.46Z | 0.32Z |

*FIG. 6*

SYSTEMS AND METHODS FOR STORING AND MINERALIZING CARBON DIOXIDE WITH LIME

CROSS-REFERENCE TO RELATED APPLICATIONS

The present application claims priority to (i) U.S. Provisional Patent Application No. 63/476,348, filed Dec. 20, 2022, (ii) U.S. Provisional Patent Application No. 63/504,974, filed May 30, 2023, and (iii) U.S. Provisional Patent Application No. 63/510,595, filed Jun. 27, 2023, the disclosures of which are incorporated herein by reference in their entireties. The present application is also related to U.S. patent application Ser. No. 18/087,728, filed Dec. 22, 2022, titled LIME-BASED CEMENT EXTENDER COMPOSITIONS, AND ASSOCIATED SYSTEMS AND METHODS, the disclosure of which is incorporated herein by reference in its entirety.

TECHNICAL FIELD

This present technology relates to storing and mineralizing carbon dioxide with lime, and associated systems and methods. Particular embodiments of the present technology relate to combining lime and carbon dioxide in soil columns for storing and mineralizing the carbon dioxide.

BACKGROUND

Portland cement is a massive contributor to greenhouse gas and carbon dioxide emissions, and it is estimated that approximately 6-8% of all greenhouse gas emissions stem from the cement used in concrete mixes, soil treatment and other construction applications. As such, there is a growing need to reduce carbon emissions related to the use of cement in construction applications. Current methods for reducing carbon emissions have attempted to, e.g., introduce recycled carbon dioxide into fresh concrete, or blend calcium oxide and carbon dioxide to increase the uptake of the carbon dioxide. However, for such methods a majority of the carbon dioxide that is introduced is not captured and is instead released to the atmosphere, or have had limited success to store and/or sequester carbon dioxide, and in many cases are not economically sustainable solutions. As such, a need exists to find a practical solution for reducing carbon dioxide emissions, particularly within applications in the construction industry wherein cement is used.

BRIEF DESCRIPTION OF THE DRAWINGS

Features, aspects, and advantages of the presently disclosed technology may be better understood with regard to the following drawings.

FIG. 6 is a table illustrating experimental results of strengthening soil by the disclosed methods, in accordance with embodiments of the present technology.

Figure 1:
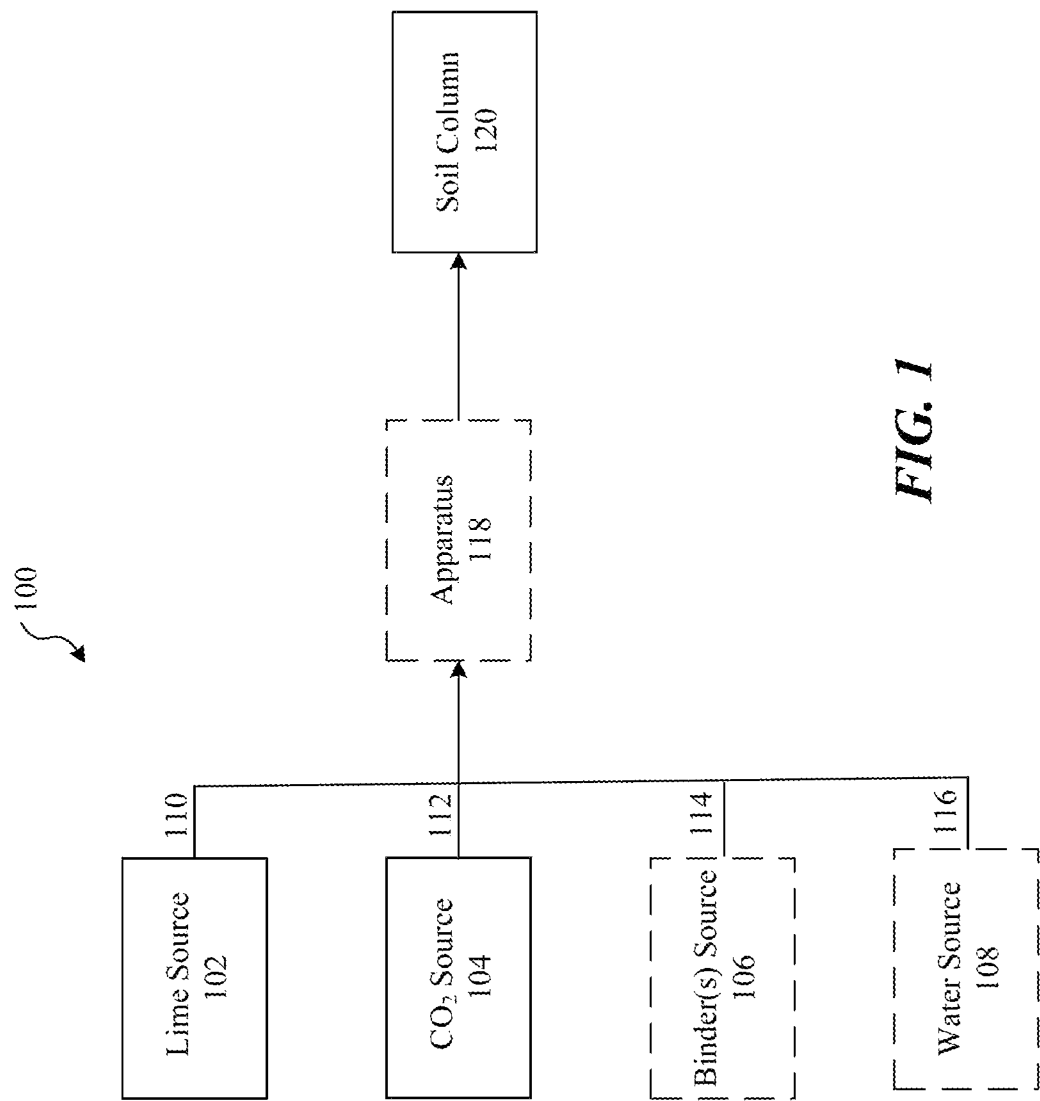
FIG. 1 is a schematic block diagram of a system for storing carbon dioxide in a soil column, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to methods and systems for adding lime and carbon dioxide to store and sequester carbon dioxide and reduce the emission of captured carbon dioxide back into the atmosphere. Portland cement is a massive contributor to greenhouse gas and carbon dioxide emissions, and it is estimated that approximately 6-8% of all greenhouse gas emissions stem from the cement used in concrete mixes, soil treatment and other construction applications. As such, there is a growing need to reduce carbon emissions related to the use of cement in construction applications. Current methods for reducing carbon emissions have attempted to, e.g., introduce recycled carbon dioxide into fresh concrete, whereby the carbon dioxide undergoes mineralization and becomes embedded in the concrete. However, for such methods a majority of the carbon dioxide that is introduced is not captured and is instead released to the atmosphere. As such, a very small percentage of the carbon dioxide introduced (e.g., less than 0.5%), measured by weight on the total concrete mix, is actually uptaken by the concrete. Other methods for reducing carbon emissions have attempted to blend calcium oxide and carbon dioxide to increase the uptake of the carbon dioxide. However, such methods have had limited success to store and/or sequester carbon dioxide, and in many cases are not economically sustainable solutions. As such, a need exists to find a practical solution for reducing carbon dioxide emissions, particularly within applications in the construction industry wherein cement is used.

Embodiments of the present technology address at least some of the above-described issues for storing and/or sequestering carbon dioxide in construction applications by mixing the carbon dioxide and lime within soil columns. For example, as described herein, embodiments of the present technology include treating soil by adding lime and carbon dioxide to a soil column. Without being bound by theory, the addition of the lime and carbon dioxide within the soil column can enable soluble calcium ions of the lime in the soil column to react with the carbon dioxide, thereby entrapping the carbon dioxide within the soil column. Strengthening the treated soil can occur by pozzolanic reactions between calcium ions from the lime and clay minerals of the soil. The pozzolanic reactions occur by solubilizing alumina and silica present in the clay minerals and promoting the formation of cementitious products through a reaction between the lime and the clay minerals. The cementitious products can include, for example, calcium-silicate-hydrates and/or calcium-aluminate-hydrates. Embodiments of the present technology can also include adding a binder to the soil in addition to the lime and carbon dioxide, which can further strengthen the treated soil in the soil column by reactions between the binder and the soil, lime, and carbon dioxide. The binder can include cement, supplementary cementitious material (SCM) (e.g., a pozzolan), and/or a manufactured calcium carbonate product.

In some embodiments, the binder or associated composition can include an admixture, which can include an accelerant, a water reducer, an activator, a superplasticizer and/or a synthetic polymer. The admixture can be configured to promote reactions between the lime particles and the SCM (e.g., pozzolan) particles, for example, to speed up the hardening of the binder, increase workability of the binder, and/or modify other properties of the binder. The admixture can be configured to promote reactions between the calcium oxide and at least one of the aluminum oxide or silicon dioxide (or other component) present in the SCM (e.g., pozzolan). In some embodiments, the binder or associated composition comprises no more than 10%, 8%, 6%, 4%, or 2% of the admixture.

As described herein, embodiments of the present technology can increase the uptake of carbon dioxide by creating reactionary alkaline environments that have a high pH, e.g., of at least 12.0. Moreover, the present technology can provide for enhanced carbon dioxide uptake by enabling contact and/or residence time between carbon dioxide and calcium released from the lime in the soil column, which may be effectively enclosed. For example, the addition of carbon dioxide with lime in a soil column can improve the capture and utilization of carbon dioxide through confinement in the soil column and processing of the carbon dioxide by an in-situ blending of the soil, lime, and carbon dioxide. The confinement can allow the carbon dioxide to react with the soil and/or lime or to be retained in the water as bicarbonates. As a result, a higher uptake of carbon dioxide can be achieved by adding carbon dioxide together with the lime compared to, for example., adding only carbon dioxide (i.e., without lime) to treat the soil.

Greenhouse gas emissions and the carbon footprint associated with embodiments of the present technology can be less than that of using cement alone, while also maintaining characteristics of conventionally treated soil or aggregate systems using cement alone. For example, the soil treated by the lime, carbon dioxide, and optionally the one or more binders, can increase the soil strength by up to 20% (e.g., measured as a 7-day strength). Embodiments of the present technology can be applied to mine backfill systems to store carbon dioxide underground and support a long-term strength development of backfill mixes stabilized using a combination of lime with cement, supplementary cementitious materials (e.g., pozzolans), a manufactured calcium carbonate product, other suitable binders, or a combination thereof. For example, carbon dioxide can be stored through reactions with residual or excess soluble calcium released from lime products. Additionally or alternatively, embodiments of the present technology can be applied to replace a portion of cement in the manufacturing of concrete blocks, pre-cast concrete structures, ready-mix concrete applications, and three-dimensionally printed concrete structures. In particular, the production of concrete products that include replacing a portion of cement with a combination of lime, carbon dioxide, and SCM (e.g., pozzolan) can have the benefits of increasing carbon dioxide storing and sequestration.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Methods and Systems for Adding Carbon Dioxide and Lime to Soil Columns

FIG. 1 is a schematic block diagram of a system 100 for storing carbon dioxide in a soil column, in accordance with embodiments of the present technology. The system 100 can include a lime source 102 and a carbon dioxide source 104, which are coupled to a soil column 120 such that fluids (e.g., liquid, slurry, or gas) from the lime source 102 and the carbon dioxide source 104 can be transferred to the soil column 120. For example, the lime source 102 is coupled to the soil column 120 via a connector 110, and the carbon dioxide is coupled to the soil column 120 via a connector 112. The connector 110/112 can be a tube, a rod, a pipe, or any other type of conduit for transferring liquids, slurries, and/or gases. The connector 110/112 can also be a conveyer belt for transferring solid materials or nearly solid (e.g., lime, pozzolan, or cement).

In some embodiments, the system 100 further include a binder source 106. The binder source 106 can be coupled to the soil column 120 via one or more connectors 114. In some embodiments, the system 100 can also include a water source 108 coupled to the soil column 120 via a connector 116. In some embodiments, the system 100 further includes an apparatus 118 (e.g., a soil drill) for adding compounds from the lime source 102, carbon dioxide source 104, binder source 106, and/or water source 108 (collectively referred to as "the sources") to the soil column 120. The apparatus 118 can further be configured to mix the compounds with soil of the soil column 120. The mixing can be done during and/or after the addition of the compounds to the soil column 120. As used herein, "soil" can refer to any combination of water, fine aggregates (e.g., sand, silt, clay, etc.) and coarse aggregates (e.g., stones, rocks, etc.).

In some embodiments, the binder source 106 includes an admixture. The admixture can comprise an accelerant, a water reducer, an activator, a superplasticizer, and/or a synthetic polymer. The admixture can be in a form of a fluid or a solid material (e.g., a powder), and can include a chloride, calcium chloride, sodium thiocyanate, calcium formate, calcium nitrate, and/or calcium nitrite. An accelerant can be configured to speed the setting time and thereby reduce cure time of the binder. Moreover, an accelerant can enable setting and curing of the binder at low temperatures (e.g., during winter weather). The water reducer can include a superplasticizer and/or synthetic polymer (e.g., synthetic sulfonate or polycarboxylate). The water reducer can be configured to reduce water content in the binder, decrease porosity thereby increasing strength and reducing water permeability of the end product, increase workability, and/or improve durability by reducing the diffusivity of aggressive agents in the end product.

The system 100 can also include a plurality of weighing devices configured to weigh each of the lime source 102, carbon dioxide source 104, binder source 106, and water source 108. For example, the weight can be used for determining the amount of a respective compound inside each of the sources. The system 100 can also include one or more controllers for controlling the flow of liquids and/or gases from each of the sources. For example, the connector 112 coupled with the carbon dioxide source 104 can include a fluid flow meter for controlling the speed and volume of carbon dioxide being transferred from the carbon dioxide source 104 to the soil column 120. The system 100 can further include one or more mixing devices for mixing compounds from the sources 102 through 108 before adding them to the soil column 120.

The lime source 102 can include quicklime (i.e., calcium oxide), lime slurry, lime kiln dust and/or hydrated lime (i.e., calcium hydroxide). The lime can have a calcium content of at least 80%, 85%, 86%, 87%, 88%, 89%, 90%, 91%, 92%, 93%, 94%, or 95% by weight. The lime can have a median particle size of less than 0.375 inches. The lime can be configured to provide alkalinity and calcium hydroxide to the mixture in the soil column 120 which, as described elsewhere herein, can in part enable pozzolanic reactions to occur and strength gain for the mixture and/or the soil. The carbon dioxide source 104 can include flue gas and/or compressed carbon dioxide. As such, the carbon dioxide source 104 can be pure carbon dioxide or less than pure carbon dioxide. The carbon dioxide can also be in a dissolved form (e.g., dissolved in water) of carbonic acid or bicarbonates.

The binder source 106 can include a cement source including cement, a supplementary cementitious material (SCM) source (e.g., a pozzolan source), and/or a manufactured calcium carbonate product source. The SCM source can include natural pozzolan, volcanic ash, calcined clay, silicate, aluminate, silica flume, bauxite residue, lithium slag, fly ash, ground granulated blast furnace slag or pozzolan slag. In some embodiments, the SCM source can include (i) at least 5%, 6%, 7%, 8%, 9%, 10%, or a range of 5-10% by weight aluminum oxide, (ii) at least 50%, 55%, 60%, 61%, 62%, 63%, 64%, 65%, or a range of 50-65% by weight silicon dioxide, (iii) at least 50,000 ppm, 52,000 ppm, 54,000 ppm, or 56,000 ppm, or a range of 50,000-56,000 ppm potassium dioxide, and/or (iv) at least 30,000 ppm, 32,000 ppm, 34,000 ppm, 36,000 ppm, or a range of 30,000-36,000 ppm sodium oxide, e.g., as determined by elemental analysis from Inductively Coupled Plasma (ICP) methods. The SCM source can act as the silicate and aluminate source for the mixture and/or end product, and in part can enable the downstream mixture and/or end product to build the strength of the soil via pozzolanic reactions. The manufactured calcium carbonate product source can include one or more of pulverized limestone, precipitated calcium carbonate, and other forms of manufactured calcium carbonate.

The water source 108 can include water that can be combined with any other compounds of the system 100. For example, the water can be used to mix lime into a lime slurry or dissolve carbon dioxide gas into carbonic acid.

The apparatus 118 can be a soil drill (also referred to as an earth auger or earth drill). A soil drill refers to a drilling tool or machine configured to penetrate an area of soil and generate a column within the penetrated area of the soil. For example, the soil drill can include a vertical rod with one or more blades attached to the lower end of the rod to penetrate the soil while rotating. An exemplary soil drill is described with respect to FIG. 2.

The soil column 120 can include a defined portion of land formed, for example, by drilling (e.g., by the apparatus 118). The soil column 120 includes the soil from the land as well as any compounds that are added by the system (e.g., lime, carbon dioxide, cement, SCM (e.g., pozzolan), water, or a combination thereof). The soil column 120 can have a predetermined depth below a ground surface (e.g., a distance between the ground level and the bottom of the soil column 120). The predetermined depth can be, for example, at least 5 feet, at least 6 feet, at least 7 feet, at least 8 feet, at least 9 feet, or at least 10 feet below the ground level. The soil column 120 can have a predetermined diameter of at least at least 0.5 meters, at least 1.0 meter, at least 1.5 meters, at least 2 meters, or at least 2.5 meters. In some embodiments, the soil column 120 has a diameter ranging from 0.5 meters to 2.5 meters or from 0.6 meters to 2.4 meters. A shape of the soil column 120 can be selected to enable efficient carbon dioxide storage, sequestration, and/or mineralization by providing contact between lime, carbon dioxide, soil, and/or one or more binders and for improved residence time. For example, the soil column 120 can have a cylindrical shape.

Figure 2:
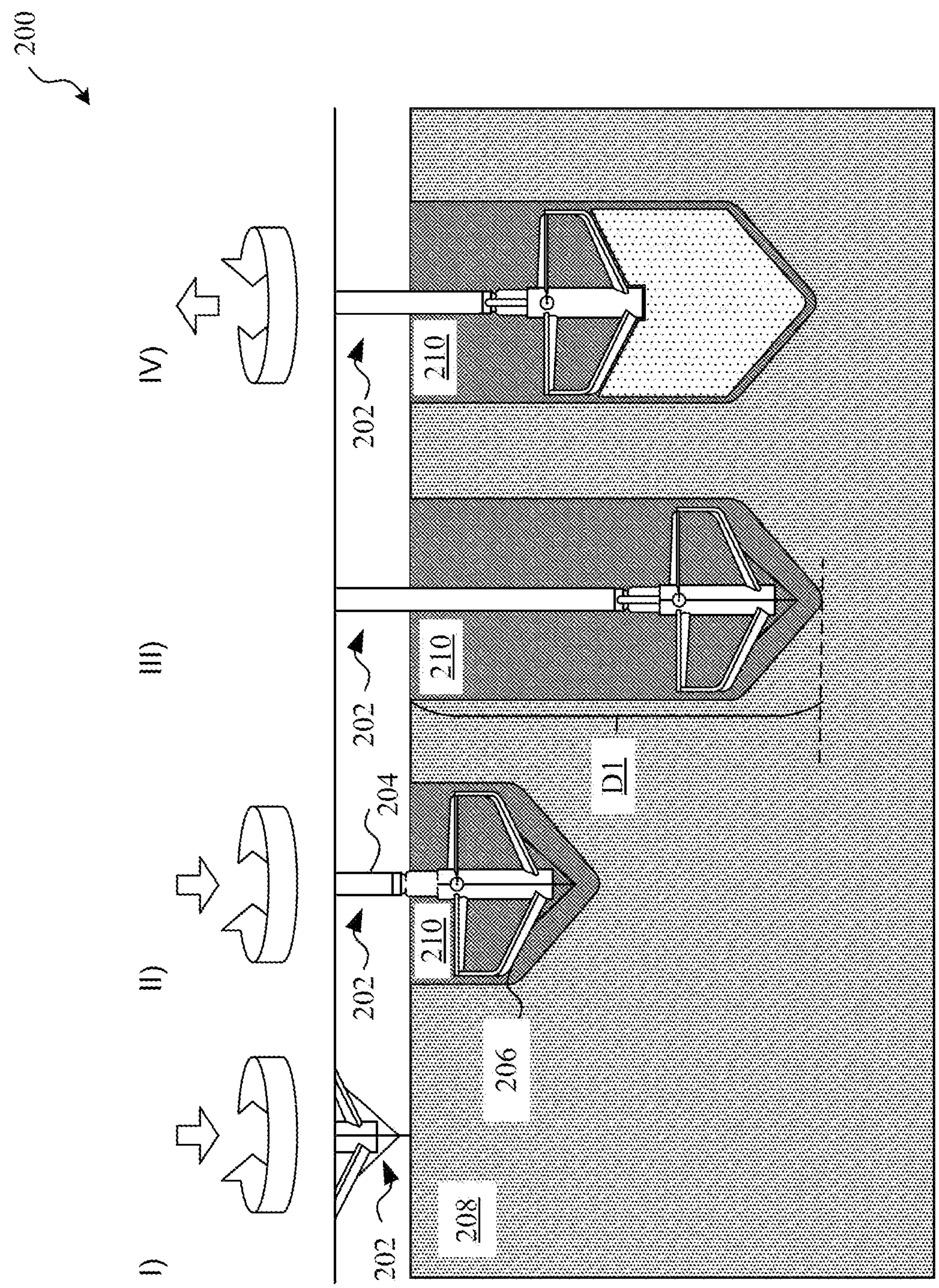
FIG. 2 is a schematic illustration of a method of adding carbon dioxide and lime to a soil column, in accordance with embodiments of the present technology.

FIG. 2 is a schematic illustration of a method or system 200 of adding carbon dioxide and lime to a soil column 212 with a soil drill 202, in accordance with embodiments of the present technology. As shown in FIG. 2, Sections I-IV occur sequentially with Section I occurring first. In some embodiments, the soil drill 202 corresponds to, or is part of, the apparatus 118 described with respect to FIG. 1. The soil drill 202 is coupled with a lime source (e.g., the lime source 102), a carbon dioxide source (e.g., the carbon dioxide source 104) and optionally a binder source (e.g., the binder source 106) and a water source 108 (e.g., the water source 108). For illustrative purposes, the compound sources are not shown in FIG. 2. The soil drill 202 includes a rod 204 and a blade or end portion 206 ("blade portion") coupled with a first end of the rod 204 such that when the soil drill 202 is rotated, the blade portion 206 penetrates a ground area (e.g., a soil ground 208).

In Section I, the soil drill 202 rotates in a first direction (e.g., clockwise) as the soil drill 202 is positioned near the surface of the soil ground 208. As shown, the rod 204 is positioned perpendicular to a surface of the soil ground 208. In Section II, the soil drill 202 penetrates the soil ground 208 while rotating in the first direction so that a soil column 212 starts to form. The penetration includes movement of the soil drill in a vertical direction away from the surface of the soil ground 208). In Section III, the soil drill 202 has penetrated the soil ground 208 to a predetermined depth DI of at least 5 feet, at least 6 feet, at least 7 feet, at least 8 feet, at least 9 feet, or at least 10 feet below the ground level). While penetrating the soil ground 208, the soil drill 202 generates the soil column 212 having the depth DI while also breaking and mixing the soil within the volume defined by the soil column 212. In some embodiments, the generated soil column 212 is enclosed (e.g., closed from all sides). For example, penetrating the soil ground 208 with the soil drill 212 can generate an enclosed temporary column into which carbon dioxide, lime and/or binders can be injected. As the soil 212 is withdrawn upwards and ultimately reaches the surface of the soil column, the soil column can be closed on the surface by the soil in the soil column itself.

In Section IV, the soil drill 202 is withdrawn from the soil ground 208 by rotating the soil drill 202 in a second direction that is opposite to the first direction (e.g., counterclockwise) and/or withdrawing the rod 204. At Section IV, the soil drill 202 also adds compounds from the sources (e.g., the lime source 102, the carbon dioxide source 104, the one or more binder sources 106 and/or the water source 108) to the soil column 212 while the soil drill 202 is withdrawn. The rotation of the blade portion 206 further mixes the added compounds with the soil in the soil column 212 while the soil drill 202 is withdrawn. In some embodiments, the method or system 200 can include adding lime from the lime source 102 (FIG. 1) and/or adding carbon dioxide from the carbon dioxide source 104 (FIG. 1). The carbon dioxide from the carbon dioxide source 104 can be added prior to or after adding the lime from the lime source 102. In some embodiments, the method or system 200 includes adding lime from the lime source 102 and one or more binders from the binder source 106 either concurrently or sequentially (e.g., lime first and one or more binders afterward, or vice versa). Adding the binder can include adding cement, supplementary cementitious material (e.g., pozzolan), a manufactured calcium carbonate product, or a combination thereof. Water from the water source 108 can be added concurrently or sequentially with the lime and/or the one or more binders. For example, quicklime from the lime source 102 can be added together or sequentially with water from the water source 108 so that the water hydrates the lime. The carbon dioxide from the carbon dioxide source can be added after the lime and the one or more binders are added and mixed with the soil in the soil column 212. The addition of carbon dioxide can be done by injecting the carbon dioxide (e.g., in a form of flue gas, compressed carbon dioxide, or dissolved in a form of carbonic acid or bicarbonates) into the soil column through the soil drill 202. Adding the lime, carbon dioxide, and/or one or more binders can be done during withdrawing of the soil drill 202 from the soil column (e.g., going up) or during penetration of the soil ground 208 by the soil drill 202 (e.g., going down). For example, in instances where the lime is in a form of a lime slurry, the lime slurry can be added to the soil column 212 and mixed within the soil while the soil drill 202 is penetrating the soil ground 208.

III. Methods for Storing and/or Sequestering Carbon Dioxide in Soil

Figure 3:
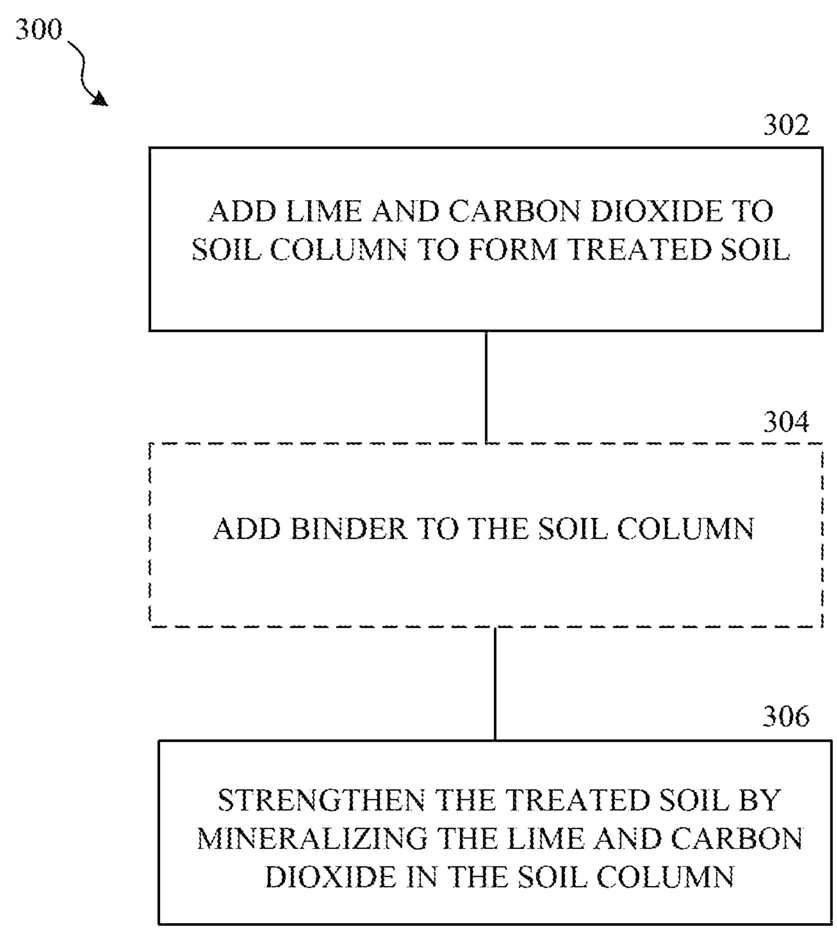
FIG. 3 is a flow diagram of a method of storing carbon dioxide in a soil column, in accordance with embodiments of the present technology.

FIG. 3 is a flow diagram of a method 300 of storing and/or sequestering carbon dioxide in a soil column, in accordance with embodiments of the present technology. The method 300 includes adding lime and carbon dioxide to a soil column including soil to form treated soil (e.g., as described with respect to method or system 200 in FIG. 2) (process portion 302). The lime and carbon dioxide can correspond to the lime and carbon dioxide, respectively, described with reference to FIGS. 1 and 2. As such, the lime can include quicklime, lime slurry, lime kiln dust, or hydrated lime, and the carbon dioxide can include flue gas and/or compressed carbon dioxide. In some embodiments, the carbon dioxide is in a dissolved form of carbonic acid or bicarbonates, in which the bicarbonates and carbonic acids in the dissolved form can be reactive. The carbon dioxide can have a purity of at least 10%, 15%, 20%, 30%, 40%, 50%, 60%, 70%, 75%, 80%, 85%, 90%, or 95%.

In some embodiments, the carbon dioxide and lime can be added to the soil using the system 100 described with respect to FIG. 1. As such, the lime can be added from the lime source 102 (FIG. 1) and the carbon dioxide can be added from the carbon dioxide source 104 (FIG. 1) to the soil column 120 (FIG. 2) with the apparatus 118 (FIG. 2). The carbon dioxide and the lime can be added to the soil column concurrently or sequentially. For example, when the carbon dioxide is liquid carbon dioxide, the carbon dioxide can be added to the soil column prior to adding the lime and/or the binder to the soil column. As another example, when the carbon dioxide is a flue gas, the carbon dioxide can be injected to the soil column via a soil drill subsequent to adding the lime.

In some embodiments, the method 300 includes adding a binder to the soil column (e.g., the soil column 212) (process portion 304) and mixing the binder with the soil, lime, and carbon dioxide. The binder can include any of the binders described with reference to FIGS. 1 and 2. A binder can be added to the soil column with an apparatus (e.g., the apparatus 118; FIG. 2) and mixed with the lime and carbon dioxide. The mixing can include mixing the soil, lime, binder, and carbon dioxide with the blade portion 206 while withdrawing the soil drill from the soil column (e.g., as described in FIG. 2). A percentage of a combination of the lime and carbon dioxide to the binder compound can range from 3-8 wt %, 3-6 wt %, 3-4 wt %, 5-8 wt %, 5-7 wt %, 4-8 wt %, 4-7 wt %, or 4-6 wt %.

The method 300 also includes, after process portions 302/304, strengthening the treated soil in the soil column by mineralizing the lime and carbon dioxide in the soil column (process portion 306). Strengthening the treated soil can occur by pozzolanic reactions between calcium ions released from the lime and clay minerals of the soil. As used herein, clay minerals can refer to hydrous aluminum phyllosilicates including iron, magnesium, alkali metals, alkaline earth metals, and/or other cations. Pozzolanic reactions refer to, for example, chemical reactions between silica and/or alumina components, calcium hydroxide, and water. For example, adding lime to soil including reactive clays can modify the clay in the soil to gain strength as well as react with carbon dioxide. Thus, in instances of certain types of soils, no binder is required but the rather the soil itself can function as a binder (e.g., as pozzolan) in the presence of lime. Pozzolanic reactions are described in additional detail in U.S. Pat. No. 11,027,995 (U.S. patent application Ser. No. 16/184,689), issued Jun. 6, 2021, the disclosure of which is incorporated herein by reference in its entirety and included as Appendix A.

Adding the binder to the soil column can also strengthen the treated soil in the soil column by reactions between the binder and the soil, lime, and carbon dioxide. Mineralizing the lime and carbon dioxide in the soil column can be configured to enhance the uptake of carbon dioxide relative to a soil column consisting of carbon dioxide and not lime. For example, uptake of the carbon dioxide can be 0.785 units per one unit of the calcium oxide, and/or a ratio of the molecular weights of carbon dioxide to calcium can be 44-56 based on calcium oxide operating as a base. This results in the formation of insoluble calcium carbonate (limestone).

In some embodiments, adding the lime and carbon dioxide to the soil column can include adding the lime to the soil column first, and adding the carbon dioxide to the soil column including the lime, thereby enabling soluble calcium ions of the lime to react with the carbon dioxide. Adding carbon dioxide to the soil column including lime can also enable soluble calcium ions of the lime in the soil column to react with the carbon dioxide to form calcium bicarbonate, and lead to the formation of carbonic acid (e.g., due to high pH and hydroxide formation). In some embodiments, the soluble calcium can be configured to mineralize at least some of the carbon dioxide into a functional calcium carbonate phase. The strengthening of the treated soil can occur by pozzolanic reactions between calcium ions released from the lime and clay minerals of the soil. The pozzolanic reactions can include solubilizing alumina and silica present in the clay minerals and promoting the formation of cementitious products through reactions between the lime and the clay minerals. The cementitious products can include calcium-silicate-hydrates and/or calcium-aluminate-hydrates. In some embodiments, the soluble calcium can be configured to chemically activate the SCM and convert the SCM (e.g., in water) to cementitious calcium-silicate-hydrates and/or calcium-aluminate-hydrate phases, which can contribute towards strength development. Furthermore, the addition of lime and carbon dioxide to the soil column can enable soluble calcium ions of the lime in the soil column to react with the carbon dioxide by entrapping the carbon dioxide within the soil column. In some embodiments of the method 300, the added carbon dioxide can be sequestered via the formation of calcium carbonate in the soil column.

In some embodiments, the strengthening can occur via two concurrent and distinct mechanisms reactions. For example, first mineralization reactions between calcium from the lime and carbon dioxide, and second pozzolanic reactions between calcium (e.g., excess calcium) from the lime and clay minerals (e.g., from the soil) at a high pH (e.g., pH>12). The pozzolanic reactions, which are enabled by solubilizing the alumina and silica present in clay minerals, promote the formation of cementitious products (e.g., calcium-silicate-hydrates, calcium-aluminate-hydrates, etc.) through reaction with lime. Without being bound by theory, the high pH can increase the absorption of carbon dioxide into the process water, as the system wants to reach equilibrium by Henry's Law which will drive the movement of carbon dioxide into the water until the partial pressures reach equilibrium.

Figure 5:
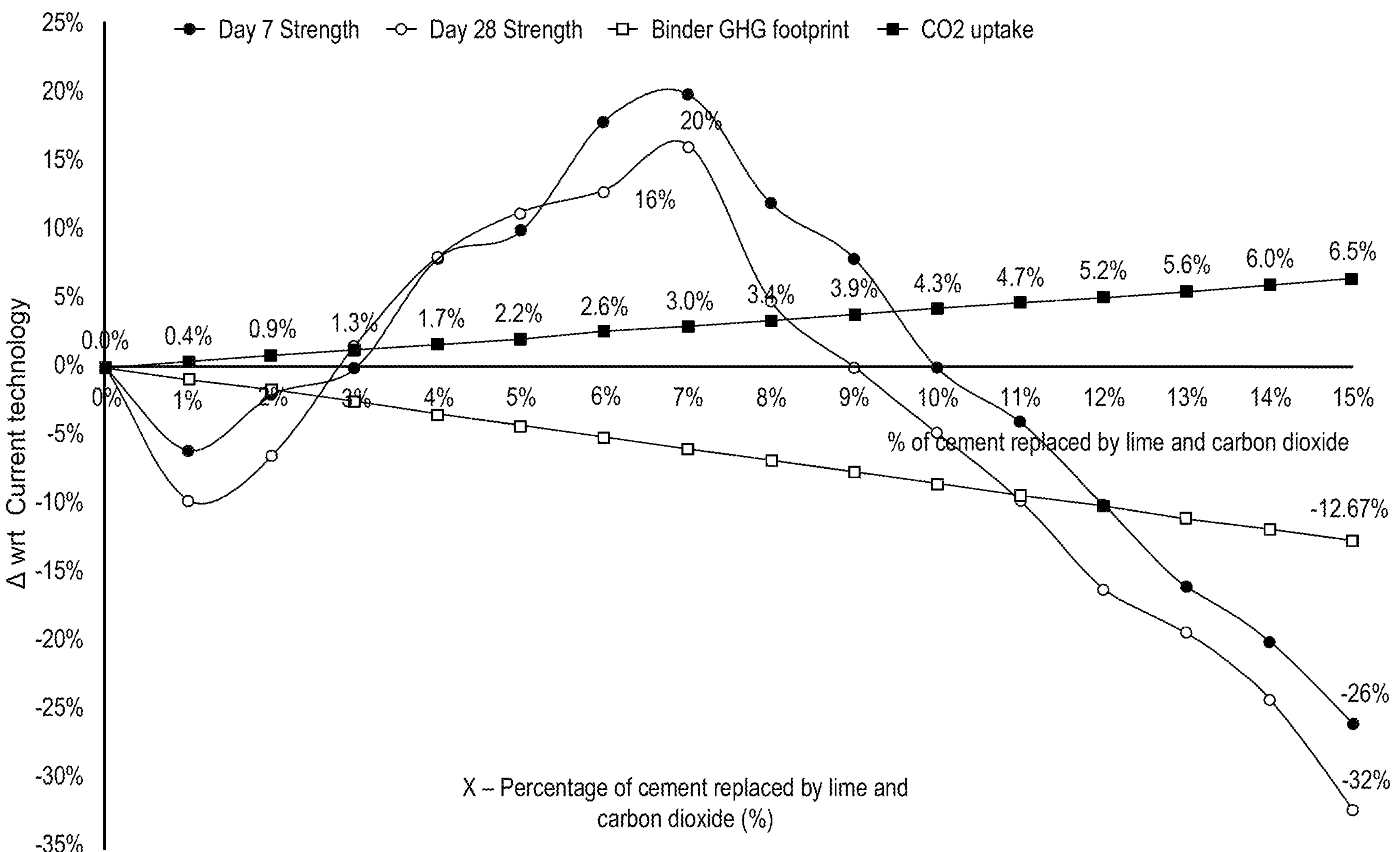
FIG. 5 is a graphical illustration of experimental results of strengthening soil by the disclosed methods, in accordance with embodiments of the present technology.

In some embodiments, the soil treated with the addition of lime and carbon dioxide can have a 7-day strength that is 3-20% higher than that of non-treated soil, and a 28-day strength that is 5-20% higher than that of non-treated soil (see, e.g., FIGS. 5 and 6). Such treated soil can also have a carbon dioxide uptake that is increased by at least about 2% compared to non-treated soil.

In some embodiments, the binder includes cement, a supplementary cementitious material, or a combination thereof. For example, when the binder includes cement, adding cement to the soil column forms a mixture of cement, lime, and carbon dioxide. The mixture can include at least 80%, 85%, 90% 93%, 94%, 95%, 96%, or 97% cement. In some embodiments, the mixture can include a lower percentage of cement (e.g., less than 50%, less than 60%, less than 70%, or less than 80%) as long as the strength requirements are met. For example, strength requirements can be met as a result of formation of calcium carbonate due to (i) reactions between lime and carbon dioxide, and (ii) pozzolanic reactions between calcium from lime and clay minerals or added pozzolan sources. Conditions that enable such reactions include high pH levels, an optimal Ca:Si ratio range, and the presence of sufficient water for enabling hydration reactions. Lower cement concentration can provide additional calcium oxide concentration for carbonation. The mixture can include less than 5.2% lime, 1-5.2% lime, 1-4% lime, or 1.7-3.7% lime. The mixture can include at least 1%, 1.1%, 1.2%, 1.3%, 1.5%, 1.7%, 2.0%, 2.3%, 2.5%, or 2.8% of carbon dioxide. For example, in some embodiments the mixture of cement, lime, and carbon dioxide includes 92-97% cement, 1.7-3.7% lime, and 1.3-2.8% carbon dioxide. When the method 300 includes adding cement as a binder to the soil column to form a mixture of cement, lime, and carbon dioxide, the soil can have a 28-day strength that is 1-20% higher than that of non-treated soil.

In some embodiments, the binder includes a SCM (e.g., pozzolan) such as oxides of silicon, aluminum, and/or iron. In some embodiments, the SCM includes at least 50%, 60%, 70%, 80%, 90%, or 50-90% at least one of amorphous silicon dioxide, amorphous aluminum oxide, or amorphous iron oxide by weight. Adding the SCM to the soil in the soil column can strengthen or stabilize the treated soil in the soil column by reactions between the pozzolan and the soil, lime, and carbon dioxide. In some embodiments, at least 50%, 60%, 70%, 80%, 90%, 95%, or 50-95% of the SCM has a particle size of no more than 30 μm, 45 μm, 60 μm, 74 μm, 90 μm, 30-90 μm. The SCM can have a median particle size no more than 50 μm, 45 μm, 40 μm, 35 μm, 32 μm, or within a range of 32-50 μm. The median particle size can affect the strengthening effect causes by the SCM. In some embodiments, the method 300 includes adding the SCM to the soil containing the lime and carbon dioxide and maintaining a pH of the mixture of at least 10.

In some embodiments, the manufactured calcium carbonate product and/or the calcium carbonate formed via the chemical reaction between the lime and the carbon dioxide included in the composition includes particles having a size distribution between 1-100 μm, 2-75 μm, or 3-74 μm. In some embodiments, the calcium carbonate is optimized based on the size distribution of the aggregates in the system to provide additional strength (e.g., via particle packing effects).

In some embodiments, the binder includes a manufactured calcium carbonate product. The manufactured calcium carbonate product can include pulverized limestone, (i.e., calcium carbonate), precipitated calcium carbonate, and/or other forms of manufactured calcium carbonate. For example, when the binder includes the manufactured calcium carbonate product, adding the binder to the soil columns forms a mixture of the manufactured calcium carbonate products, lime, and carbon dioxide. In some embodiments, the manufactured calcium carbonate product can be added in lieu of the lime and/or carbon dioxide.

In some embodiments, the binder includes cement, a SCM (e.g., pozzolan), and a manufactured calcium carbonate product. For example, when the binder includes cement, the SCM, and the manufactured calcium carbonate, adding the binder to the soil column forms a mixture of cement, lime, the SCM, manufactured calcium carbonate, and carbon dioxide. For example, the mixture includes 35-50% cement (e.g., 35-45%, 40-50%, or 45-50% of cement), 3-9% lime (e.g., 3-5%, 5-9%, or 4-8% lime), up to 15% SCM (e.g., up to 5%, up to 10%, or up to 15% SCM), 39-44% manufactured calcium carbonate (e.g., 39-42% or 42-44% manufactured calcium carbonate), and up to 3% carbon dioxide (e.g., up to 1%, up to 2%, or up to 3% carbon dioxide). As another example, the mixture includes up to 24% cement (e.g., up to 5%, up to 10%, up to 15%, up to 20%, or up to 24% cement), 8-13% lime (e.g., 8-10%, 10-13%, or 9-12% lime), 15-30% SCM (e.g., 15-25%, 25-30%, 20-30% SCM), 50-55% manufactured calcium carbonate (e.g., 50-52% or 52-55% manufactured calcium carbonate), and up to 3% carbon dioxide (e.g., up to 1%, up to 2%, or up to 3% carbon dioxide).

In some embodiments, the method 300 further includes adding water to the soil column including the treated soil, lime, and carbon dioxide, as described with reference to FIG. 1. Water can be added from a water source (e.g., the water source 108; FIG. 1) to the soil column with an apparatus (e.g., the apparatus 118; FIG. 1) and mixed with the lime, carbon dioxide and or one or more binders.

In some embodiments, the binder includes a combination of cement and a SCM (e.g., pozzolan) to form a mixture of cement, SCM, lime, and carbon dioxide. In such embodiments, the mixture can include 60-90% or 70-90% of cement, 2-10% or 5-10% of SCM, 2-10%. 3-10%, 4-10%, 5-10%, 2-9%, 3-9%, 4-9%, or 5-9% of lime, and 1-20%, 1-18%, 1-16%, 1-14%, 1-12%, 1-10%, 1-8%, 1-6%, 1-4%, or 1-3% of carbon dioxide. For example, the mixture of cement, SCM, lime, and carbon dioxide can include 74-87% cement, 5.2-8.2% lime, 5-15% SCM, and up to 2.8% carbon dioxide. In some embodiments, the binder includes a combination of cement and the manufactured calcium carbonate product to form a mixture of cement, the manufactured calcium carbonate products, lime, and carbon dioxide. In some embodiments, the binder includes a combination of a SCM and the manufactured calcium carbonate product to form a mixture of the SCM, the manufactured calcium carbonate product, lime, and carbon dioxide. The calcium carbonate can be mixed with the lime together with or separately from the SCM.

In some embodiments, the method 300 further includes generating the soil column by penetrating a soil area with a soil drill to a predetermined depth (e.g., Sections I to III in FIG. 2). Adding the carbon dioxide includes injecting the carbon dioxide through the soil drill (e.g., the soil drill 202; FIG. 2) to the soil column (e.g., the soil column 212) while withdrawing the soil drill from the soil column subsequent to generating the soil column (e.g., Section IV in FIG. 2). In some embodiments, adding the lime includes adding a slurry including the lime and a binder to the generated soil column. The binder can include cement, supplementary cementitious material (e.g., pozzolan, fly ash, slag, cement, and/or silica fume), and/or the manufactured calcium carbonate product. Adding the carbon dioxide can include injecting the carbon dioxide through the drill to the soil column while withdrawing the soil drill from the soil column and/or subsequent to adding the slurry. While withdrawing the soil drill from the soil column, the method 300 can include mixing (e.g., with the blade portion 206 of the soil drill 202) the carbon dioxide with the slurry in the soil column.

In some embodiments, the method 300 includes adding cement and/or supplemental cementitious material to the soil column while penetrating the soil area with the soil drill. The method 300 can also include hydrating the cement and/or supplemental cementitious material in the soil column by adding water (e.g., from the water source 108 in FIG. 1). The hydrated cement and/or supplemental cementitious in the soil column can have a first alkaline pH (e.g., pH of about 10). Adding the lime can be done after adding the cement and/or supplemental cementitious material and hydrating the cement. The mixture of cement and/or supplemental cementitious material and lime can have a second pH of at least 12 (e.g., the second pH is higher than the first pH). The method 300 can further include adding a SCM (e.g., pozzolan) to the soil column to form a mixture of SCM, cement and/or supplemental cementitious material, and lime. The SCM can include oxides of silicon, aluminum, and iron. Soluble calcium from the mixture can react with active forms or oxides of silicon, aluminum, and iron of the SCM such that the mixture has a third pH that of at least 10 (e.g., the third pH is about 10, 10.5, or 11). The carbon dioxide can be then added by injecting the carbon dioxide into the mixture while withdrawing the drill from the soil column.

In some embodiments, the soil column is a closed system such that the carbon dioxide is inhibited from escaping. In some embodiments, the soil column has a predefined depth. For example, as described for the soil drill 202 in FIG. 2, the depth of the soil column can be at least 3, 4, 5, 6, 7, 8, 9, or 10 feet below a ground surface.

Figure 4:
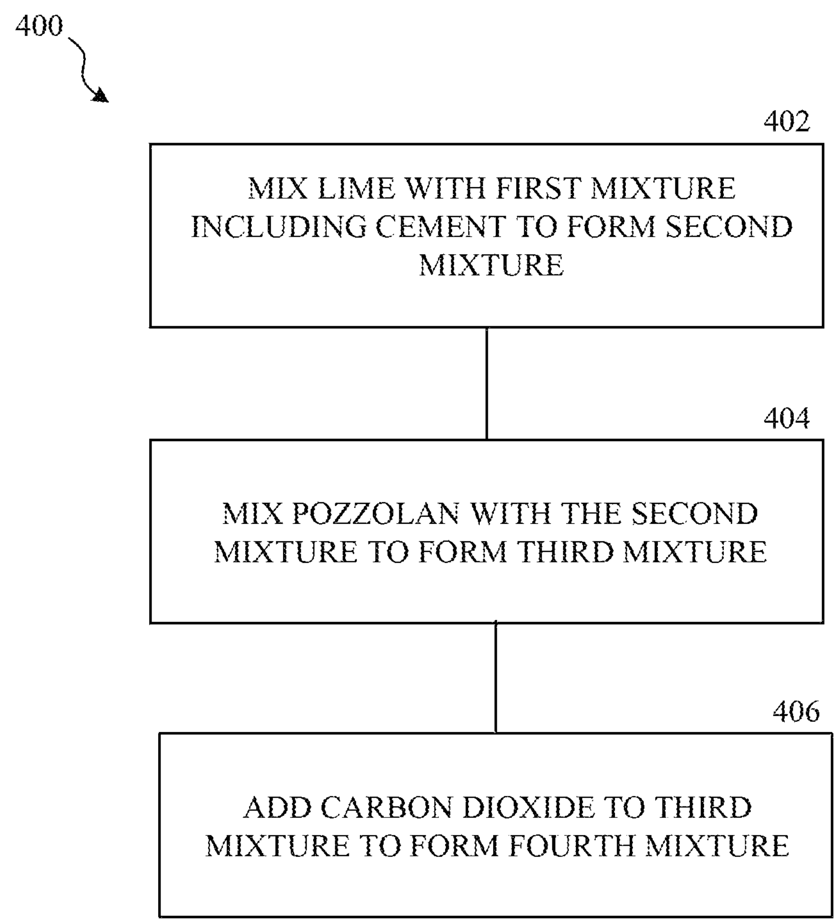
FIG. 4 is a flow diagram of a method of sequestering carbon dioxide, in accordance with embodiments of the present technology.

FIG. 4 is a flow diagram of a method 400 of sequestering carbon dioxide, in accordance with embodiments of the present technology. The method 400 can include mixing lime (e.g., quicklime and/or a lime slurry) with a first mixture including cement to form a second mixture (process portion 402). The first mixture has an alkaline pH, e.g., ranging from 9-11 (e.g., the pH can be about 10). The second mixture can have a higher pH than the first mixture. For example, the pH of the second mixture can be at least 12.0, at least 12.5, or at least 12.45, and includes soluble calcium cations.

The method 400 can further include mixing a SCM (e.g., pozzolan) with the second mixture to form a third mixture (process portion 404). The SCM can include a source of silicon, aluminum, and iron. Adding the SCM can cause the soluble calcium cations to react with forms or oxides of the silicon, aluminum, and/or iron to form nucleation sites. Additionally, adding the SCM after mixing lime with the first mixture can promote pozzolanic reactions since the pH of the second mixture is at least 12.0.

The method 400 can further include adding carbon dioxide to the third mixture to form a fourth mixture (process portion 406). Adding the carbon dioxide can cause the carbon dioxide to react with the soluble calcium cations to form calcium carbonate. The carbon dioxide can be added such that the pH remains above 11.0, 10.5, or 10.0. The fourth mixture can have a calcium:silicon ratio of 0.5-0.8. In some embodiments, the fourth mixture can have a density higher than that of the third mixture due to the calcium carbonate of the formed mixture formed by reactions between the carbon dioxide and the soluble calcium cations.

IV. Compositions

The present disclosure also relates to compositions for storing carbon dioxide in a soil column. The compositions can be added to soil in the soil column with the systems and methods described with respect to FIGS. 1-4.

In some embodiments, a composition includes cement, lime, a SCM (e.g., pozzolan), calcium carbonate, and carbon dioxide, as described with respect to FIGS. 1-4. For example, the composition includes 35-50% of cement by weight of the composition, 1-10% of lime by weight of the composition, up to 20% of a pozzolan by weight of the composition, 35-50% of calcium carbonate by weight of the composition, and up to 5% of carbon dioxide by weight of the composition. In some embodiments, a composition includes lime, a SCM, calcium carbonate, and carbon dioxide, as described with respect to FIGS. 1-4. For example, the composition includes 5-30% of lime by weight of the composition, 45-90% of a SCM by weight of the composition, 1-20% of calcium carbonate by weight of the composition, and up to 5% of carbon dioxide by weight of the composition. In another example, the composition includes 10-15% of lime by weight of the composition, 65-90% of a SCM by weight of the composition, and 5-12% of calcium carbonate by weight of the composition. In another example, the composition includes 20-30% of lime by weight of the composition, 45-65% of a SCM by weight of the composition, and 1-6% of calcium carbonate by weight of the composition. In some embodiments, the composition can be a binder composition for storing carbon dioxide.

The compositions disclosed herein are configured to be mixed with soil in the soil column and strengthen the soil in the soil column by mineralizing the lime and the carbon dioxide in the soil column. For example, 100 kilograms to 300 kilograms of the composition is configured to be mixed with 1 cubic meter of soil in the soil column to strengthen the soil. A soil treated with the composition can have a 28-day strength that is greater or equal to 360 kilopascals and up to 2 megapascals within 28-56 days of treatment. The soil treated with the composition can have an undrained shear strength that is greater or equal to 180 kilopascals after 28 days and up to 1 megapascals within 28-56 days of treatment. In some embodiments, when mixed with soil, the composition has an undrained shear strength that is greater or equal to 200, 250, 300, or 200-300 megapascals. In some embodiments, the composition is further configured to be mixed with water (e.g., before, after, or during the addition of the composition to the soil column). For example, a ratio of water to the composition is ranging from 0.5 to 1.

In some embodiments, a composition includes 5-15% of lime by weight of the composition, 10-35% of a SCM (e.g., pozzolan) by weight of the composition, and 45-60% of calcium carbonate by weight of the composition. The composition is configured to be mixed with (i) soil in the soil column and (ii) up to 5% of carbon dioxide by weight of the composition. The composition is for strengthen the soil in the soil column by mineralizing the lime and the carbon dioxide in the soil column.

In some embodiments, the compositions disclosed herein meet related ASTM standards, such as the Standard Specification for Coal Fly Ash and Raw or Calcined Natural Pozzolan for Use in Concrete (C618-19). For example, the compositions can satisfy the chemical requirements as set forth in Table 1 of C618-19, which is reproduced below.

TABLE 1

| | Class | | |
|---|---|---|---|
| | N | F | C |
| Silicon dioxide (SiO2) plus aluminum oxide (Al2O3) plus iron oxide (Fe2O3), min, % | 70.0 | 50.0 | 50.0 |
| Calcium oxide (CaO), % | Report only | 18.0 max | >18.0 |
| Sulfur trioxide (SO3), max, % | 4.0 | 5.0 | 5.0 |
| Moisture content, max, % | 3.0 | 3.0 | 3.0 |
| Loss on ignition, max, % | 10.0 | 6.0 | 6.0 |

In some embodiments, the compositions disclosed herein can include other values.

V. Exemplary Data

FIG. 5 is a graphical illustration of experimental results of strengthening soil by addition of lime and carbon dioxide, in accordance with embodiments of the present technology. The X-axis of the graph of FIG. 5 shows a weight percentage of cement in binder mixture replaced by lime and carbon dioxide, and the Y-axis shows a relative difference to conventional technology (e.g., using cement only). The percentage of cement in the binder mixture replaced by lime and carbon dioxide was calculated as 100−(hydrated lime %+carbon dioxide %). The binder is estimated to correspond to 15 w % of an overall mixture of binder (i.e., cement, lime, and carbon dioxide) and soil. As shown in the graph of FIG. 5, replacing a portion of cement with lime and carbon dioxide in a binder can increase the 28-day soil strength up to about 16% and the 7-day soil strength up to about 20% compared to using a binder consisting of cement only. The addition of the lime and carbon dioxide can further increase carbon dioxide uptake and reduce the estimated GHG footprint, accordingly.

As shown in FIG. 5, the 28-day strength data indicates an increase in the unconfined compressive strength of the soil when the percentage of cement replaced by lime and carbon dioxide is between about 3-9%. The maximum 28-day strength corresponds to about a 16% increase and is shown to be achieved when the percentage of cement replaced by lime and carbon dioxide is about 7%. The 7-day strength data indicates an increase in the soil strength when the percentage of cement replaced by lime and carbon dioxide is between about 3-10%. The maximum 7-day strength corresponds to about a 20% increase and is shown to be achieved when the percentage of cement replaced by lime and carbon dioxide is about 7%. The 7-day and 28-day strengths referred to in FIGS. 5 and 6 were obtained by preparing cylinders having a dimension of 2.8" diameter by 5.6" height, and testing the unconfined compressive strengths (UCS) after 7 and 28 days of curing in ambient temperatures and >95% relative humidity. The UCS test was performed in accordance to the standard procedure described in ASTM D2166. The estimated GHG footprint in FIGS. 5 and 6 was estimated based on factors 0.9 for cement, 1.0 for hydrated lime, and −1.0 for carbon dioxide. The carbon dioxide uptake was measured using a LECO 744 carbon combustion analyzer.

As shown in FIG. 5, the carbon dioxide uptake increases linearly up to about 6.5% as the percentage of cement replaced by lime and carbon dioxide increases. The carbon dioxide uptake was estimated based on 0.57 units of carbon dioxide uptake targeted per unit of hydrated lime. The carbon dioxide uptake can vary (e.g., between 0.57-0.7). For example, carbon dioxide uptake on a calcium oxide basis can be 0.75 units of carbon dioxide per unit of calcium oxide basis. The GHG footprint decreases linearly to about −13% as the percentage of cement replaced by lime and carbon dioxide increases.

FIG. 6 is a table illustrating experimental results of strengthening soil, in accordance with embodiments of the present technology. Embodiments of the present technology can correspond to the compositions, and variants thereof (e.g., +/−20%), of the "Samples" shown in the columns of FIG. 6. For example, embodiments of the present technology can include a composition comprising approximately 24% cement, 8.2% lime, 15% pozzolan (or other type of SCM), 50% manufactured calcium carbonate, and 2.5% carbon dioxide, or a composition comprising approximately 0% cement, 12.7% lime, 30% pozzolan, 54.5% manufactured calcium carbonate, and 2.8% carbon dioxide. Additionally, embodiments of the present technology can correspond to a composition Column 'Baseline' (i.e., 100 wt % of Portland Cement) was used herein as a reference having no added lime, pozzolan or carbon dioxide. Similarly, a comparison was made against a sample containing 99.6 wt % of cement and 0.4 w % of carbon dioxide (column 'Sample 1') but no lime. The Baseline and Sample I had a similar Day-28 strength (marked as X for reference). The Sample 1 had a slightly reduced estimated greenhouse gas (GHG) emission (e.g., by a factor of 0.99) compared to the Baseline (marked as Z for reference). As shown, the 28-day strength of soil increased by a maximum factor of 1.05-1.2 times the reference strength of Baseline when the treated soil ('Sample 2L' and 'Sample 2U') included 93.5 w % of cement, 3.7 w % of lime, and 2.8 wt % of carbon dioxide. The estimated GHG emission for soil treated with cement, lime and carbon dioxide was reduced by a factor of 0.94-0.97 compared to the Baseline. Similarly, the 28-day strength of soil decreased by a maximum factor of 0.8-0.9 when the treated soil ('Sample 3L' and 'Sample 3U') included 74 wt % of cement, 8.2 wt % of lime, 15 wt % of SCM (e.g., pozzolan), and 2.8 wt % of carbon dioxide. The estimated GHG emission for soil treated with cement, lime, SCM and carbon dioxide was reduced by a factor of 0.82-0.94 compared to the Baseline. Furthermore, the 28-day strength of soil decreased by a maximum factor of 0.8 when the treated soil ('Sample 4L' and 'Sample 4U') included 35 wt % of cement, 8.2 wt % of lime, 15 wt % of SCM, 39%% of manufactured calcium carbonate, and 2.8 wt % of carbon dioxide. The estimated GHG emission for soil treated with cement, lime, SCM, manufactured calcium carbonate, and carbon dioxide was reduced by a factor of 0.54-0.52 compared to the Baseline. The 28-day strength of soil decreased by a maximum factor of 0.8 when the treated soil ('Sample 5L' and 'Sample 5U') 12.7 wt % of lime, 30 wt % of SCM, 54.5% of manufactured calcium carbonate, and 2.8 wt % of carbon dioxide. The estimated GHG emission for soil treated with lime, SCM, manufactured calcium carbonate, and carbon dioxide was reduced by a factor of 0.32-0.46 compared to the Baseline.

VI. Conclusion

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, unconfined compressive strength, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. All references to 'strength' are to be understood to mean unconfined compressive strength, unless indicated otherwise. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A method for storing carbon dioxide in soil, comprising:
   - adding lime and carbon dioxide to a soil column including soil to form treated soil; and
   - after adding the lime and carbon dioxide, strengthening the treated soil in the soil column by mineralizing the lime and carbon dioxide in the soil column.

2. The method of any one of the clauses herein, further comprising:
   - adding a binder to the soil column; and
   - mixing the binder with the soil, lime, and carbon dioxide, wherein adding the binder to the soil in the soil column strengthens the treated soil in the soil column by reactions between the binder and the soil, lime, and carbon dioxide.

3. The method of any one of the clauses herein, further comprising:
   - adding a binder comprising cement or a supplementary cementitious material to the soil column; and
   - mixing the binder with the soil, lime, and carbon dioxide, wherein adding the binder to the soil in the soil column strengthens the treated soil in the soil column by reactions between the binder and the soil, lime, and carbon dioxide.

4. The method of any one of the clauses herein, wherein adding lime and/or carbon dioxide to a soil column comprises:
   - adding the lime to the soil column; and
   - after adding the lime, adding the carbon dioxide to the soil column including the lime, wherein soluble calcium ions of the lime react with the carbon dioxide.

5. The method of any one of the clauses herein, wherein adding lime and/or carbon dioxide to a soil column comprises:
   - adding the lime to the soil column;
   - after adding the lime, adding the carbon dioxide to the soil column including the lime; and
   - enabling soluble calcium ions of the lime in the soil column to react with the carbon dioxide to form carbonic acid and/or calcium bicarbonate.

6. The method of any one of the clauses herein, wherein adding lime and/or carbon dioxide to a soil column comprises:
   - adding the lime to the soil column;
   - after adding the lime, adding the carbon dioxide to the soil column including the lime; and
   - enabling soluble calcium ions of the lime in the soil column to react with the carbon dioxide, by entrapping the carbon dioxide within the soil column.

7. The method of any one of the clauses herein, wherein adding lime and/or carbon dioxide to a soil column comprises:

adding the lime to the soil column; and after adding the lime, adding the carbon dioxide to the soil column including the lime, wherein, in operation, the added carbon dioxide is sequestered via formation of calcium carbonate in the soil column.

8. The method of any one of the clauses herein, wherein the lime is quicklime, a lime slurry, lime kiln dust or hydrated lime.

9. The method of any one of the clauses herein, wherein the lime is quicklime and the method comprises hydrating the quicklime to form hydrated lime.

10. The method of any one of the clauses herein, wherein the carbon dioxide comprises flue gas and/or compressed carbon dioxide.

11. The method of any one of the clauses herein, wherein the carbon dioxide is in a dissolved form of carbonic acid or bicarbonates.

12. The method of any one of the clauses herein, further comprising:

adding a binder comprising a pozzolan to the soil column; and mixing the binder with the soil, lime, and carbon dioxide, wherein adding the binder to the soil in the soil column strengthens or stabilizes the treated soil in the soil column by reactions between the binder and the soil, lime, and carbon dioxide.

13. The method of any one of the clauses herein, wherein strengthening the treated soil occurs by pozzolanic reactions between calcium ions released from the lime and clay minerals of the soil.

14. The method of any one of the clauses herein, wherein:

strengthening the treated soil occurs by pozzolanic reactions between calcium ions released from the lime and clay minerals of the soil, and the pozzolanic reactions include solubilizing alumina and silica present in the clay minerals and/or forming cementitious products through reaction between the lime and the clay minerals, wherein the cementitious products comprise calcium-silicate-hydrates and/or calcium-aluminate-hydrates.

15. The method of any one of the clauses herein, wherein a percentage of a combination of the lime and carbon dioxide to the binder compound is within a range of 3-8 wt %.

16. The method of any one of the clauses herein, wherein an uptake of the carbon dioxide is 0.785 units per one unit of the calcium oxide.

17. The method of any one of the clauses herein, wherein the soil column is an at least partially closed system such that the carbon dioxide is inhibited from escaping.

18. The method of any one of the clauses herein, wherein the carbon dioxide is liquid carbon dioxide and is added to the soil column prior to adding the lime and/or the binder to the soil column.

19. The method of any one of the clauses herein, wherein the carbon dioxide and the lime are added to the soil column concurrently.

20. The method of any one of the clauses herein, further comprising generating the soil column by penetrating a soil area with a soil drill to a predetermined depth, wherein adding the carbon dioxide includes injecting the carbon dioxide via the soil drill to the soil column while withdrawing the soil drill from the soil column subsequent to generating the soil column.

21. The method of any one of the clauses herein, wherein mineralizing the lime and carbon dioxide in the soil column is configured to enhance uptake of carbon dioxide relative to a soil column consisting of carbon dioxide and no lime.

22. The method of any one of the clauses herein, further comprising adding water to the soil column including the treated soil, lime, and carbon dioxide.

23. The method of any one of the clauses herein, wherein the lime comprises a lime slurry.

24. The method of any one of the clauses herein, wherein the carbon dioxide has a purity of at least 10%, 15%, 20%, 30%, 40%, 50%, 60%, 70%, 75%, 80%, 85%, 90%, or 95%.

25. The method of any one of the clauses herein, further comprising adding cement to form a mixture of cement, lime and carbon dioxide, and wherein the mixture includes at least 80%, 85%, 90% 93%, 94%, 95%, 96%, or 97% cement.

26. The method of any one of the clauses herein, further comprising adding cement to form a mixture of cement, lime and carbon dioxide, and wherein the mixture includes less than 5.2% lime, 1-5.2% lime, 1-4% lime, or 1.7-3.7% lime.

27. The method of any one of the clauses herein, further comprising adding cement to form a mixture of cement, lime and carbon dioxide, and wherein the mixture includes at least 1%, 1.1%, 1.2%, 1.3%, 1.5%, 1.7%, 2.0%, 2.3%, 2.5%, or 2.8% carbon dioxide.

28. The method of any one of the clauses herein, further comprising adding cement to form a mixture of cement, lime and carbon dioxide, and wherein the mixture includes 92-97% cement, 1.7-3.7% lime, and 1.3-2.8% carbon dioxide.

29. The method of any one of the clauses herein, further comprising adding cement to the soil column to form a mixture of cement, lime and carbon dioxide, and wherein the soil has a 28-day strength that is 1-20% higher than that of a non-treated soil.

30. The method of any one of the clauses herein, further comprising adding cement and a pozzolan to form a mixture of cement, pozzolan, lime, and carbon dioxide, and wherein the mixture includes 74-87% cement, 5.2-8.2% lime, 5-15% pozzolan, and up to 2.8% carbon dioxide.

31. The method of any one of the clauses herein, wherein the treated soil has a 7-day strength that is 3-20% higher than that of a non-treated soil.

32. The method of any one of the clauses herein, wherein the treated soil has a 28-day strength that is 5-20% higher than that of a non-treated soil.

33. The method of any of the clauses herein, wherein the treated soil has a carbon dioxide uptake that is increased by at least about 2% compared to a non-treated soil.

34. The method of any of the clauses herein, wherein the soil column the lime and carbon dioxide are added to is at least 3, 4, 5, 6, 7, 8, 9, or 10 feet below a ground surface.

35. The method of any one of the clauses herein, further comprising:

adding a binder comprising a pozzolan to the soil column;

mixing the binder with the soil, lime, and carbon dioxide to form a mixture; and maintaining a pH of the mixture of at least 10.

36. The method of any one of the clauses herein, further comprising:

generating the soil column by penetrating a soil area with a drill to a predetermined depth, wherein— adding the lime includes adding a slurry including the lime and a binder to the soil column, the binder includes cement, supplementary cementitious material, pozzolan, an admixture, and/or a manufactured calcium carbonate product; and adding the carbon dioxide includes injecting the carbon dioxide through the drill to the soil column while withdrawing the soil drill from the soil column and/or subsequent to adding the slurry; and while withdrawing the soil drill from the soil column, mixing the carbon dioxide with the slurry in the soil column.

37. The method of any one of the clauses herein, further comprising:

generating the soil column by penetrating a soil area with a drill to a predetermined depth;

adding cement and/or supplemental cementitious material to the soil column while penetrating the soil area with the soil drill;

hydrating the cement and/or supplemental cementitious material in the soil column by adding water, wherein— the hydrated cement and/or supplemental cementitious in the soil column has a first alkaline pH, adding the lime occurs after adding the cement and/or supplemental cementitious material and hydrating the cement, and the mixture of cement and/or supplemental cementitious material and lime has a second pH of at least 12; and adding a pozzolan comprising forms or oxides of silicon, aluminum, and iron to the soil column to form a mixture of pozzolan, cement and/or supplemental cementitious material, and lime, wherein— soluble calcium from the mixture reacts with active forms or oxides of silicon, aluminum, and iron of the pozzolan such that the mixture has a third pH that of at least 10, and adding the carbon dioxide includes injecting the carbon dioxide to the mixture while withdrawing the drill from the soil column.

38. The method of any one of the clauses herein, further comprising adding a binder comprising a pozzolan to the soil column, wherein the pozzolan has a median particle size no more than 50 μm, 45 μm, 40 μm, 35 μm or 32 μm.

39. The method of any one of the clauses herein, further comprising adding a binder comprising an admixture to the soil column, wherein the admixture comprises at least one of an accelerant, a water reducer, and/or an activator.

40. The method of any one of the clauses herein, further comprising adding a binder comprising an admixture to the soil column, wherein the admixture comprises a water reducer including a superplasticizer and/or synthetic polymer.

41. The method of any one of the clauses herein, further comprising adding a binder comprising an admixture to the soil column, wherein the admixture comprises an accelerant including a chloride, calcium chloride, sodium thiocyanate, and calcium formate, calcium nitrate, and/or calcium nitrite.

42. The method of any one of the clauses herein, further comprising adding a binder comprising an accelerant to the soil column, wherein the accelerant comprises at least one of calcium chloride, sodium thiocyanate, calcium formate, calcium nitrate, and/or calcium nitrite.

43. The method of any one of the clauses herein, further comprising adding a binder comprising an admixture to the soil column, wherein the admixture comprises a slurry.

44. The method of any one of the clauses herein, further comprising:

adding a binder comprising a manufactured calcium carbonate product to the soil column; and mixing the binder with the soil, lime, and carbon dioxide, wherein adding the binder to the soil in the soil column strengthens the treated soil in the soil column by reactions between the binder and the soil, lime, and carbon dioxide.

45. The method of any one of the clauses herein, further comprising adding cement, a pozzolan, and a manufactured calcium carbonate product to form a mixture of cement, pozzolan, manufactured calcium carbonate product, lime, and carbon dioxide, and wherein the mixture includes 35-50% cement, 3-9% lime, up to 15% pozzolan, 39-44% manufactured calcium carbonate, and up to 3% carbon dioxide.

46. The method of any one of the clauses herein, further comprising adding cement, a pozzolan, and a manufactured calcium carbonate product to form a mixture of cement, pozzolan, manufactured calcium carbonate product, lime, and carbon dioxide, and wherein the mixture includes up to 24% cement, 8-13% lime, 15-30% pozzolan, 50-55% manufactured calcium carbonate, and up to 3% carbon dioxide.

47. A method of sequestering carbon dioxide, comprising:

mixing lime with a first mixture comprising cement to form a second mixture, wherein the first mixture has an alkaline pH, and wherein the second mixture has a pH of at least 12.0 and soluble calcium cations;

mixing a pozzolan with the second mixture to form a third mixture, wherein the pozzolan comprises silicon, aluminum, and/or iron; and adding carbon dioxide to the third mixture to form a fourth mixture.

48. The method of any one of the clauses herein, further comprising generating a soil column by penetrating a soil area with a drill, wherein adding the lime to the first mixture comprises adding the lime to the soil column containing the first mixture.

49. The method of any one of the clauses herein, further comprising generating a soil column by penetrating a soil area with a drill, wherein adding the lime to the first mixture comprises adding the lime to the soil column containing the first mixture, and wherein soil of the soil column comprises the pozzolan.

50. The method of any one of the clauses herein, wherein adding lime comprises adding quicklime and/or a lime slurry.

51. The method of any one of the clauses herein, wherein the pozzolan has a median particle size no more than 50 μm, 45 μm, 40 μm, 35 μm or 32 μm.

52. The method of any one of the clauses herein, wherein adding the carbon dioxide comprises adding carbon dioxide such that the pH remains above 11.0, 10.5, or 10.0.

53. The method of any one of the clauses herein, wherein adding the pozzolan causes the soluble calcium cations to react with forms or oxides of the silicon, aluminum, and/or iron to form nucleation sites.

54. The method of any one of the clauses herein, wherein adding the carbon dioxide causes the carbon dioxide to react with the soluble calcium cations to form calcium carbonate and/or calcium bicarbonate.

55. The method of any one of the clauses herein, wherein the fourth mixture has a density higher than that of the third mixture due to calcium carbonate of the formed mixture formed by reactions between the carbon dioxide and the soluble calcium cations.

56. The method of any one of the clauses herein, wherein the fourth mixture has a calcium: silicon ratio of 0.5-0.8.

57. A system for storing carbon dioxide in soil, the system comprising:

a lime source; and a carbon dioxide source, wherein the system is configured to:

add lime from the lime source to the soil column; and add carbon dioxide from the carbon dioxide source to the soil column, wherein the lime and the carbon dioxide are added at a predetermined depth below a ground surface.

58. A system for storing carbon dioxide in soil, the system comprising:

a lime source;

a carbon dioxide source; and an apparatus fluidically coupled to the lime source and the carbon dioxide source, wherein the apparatus is configured to:

generate a soil column at a predetermined depth below a ground surface;

receive lime from the lime source;

receive carbon dioxide from the carbon dioxide source; and add the lime and carbon dioxide to the soil column.

59. The system of any one of the clauses herein, further comprising a water source fluidically coupled to the apparatus, wherein the apparatus is configured to receive water from the water source and add the water to the soil column.

60. The system of any one of the clauses herein, further comprising a binder source, wherein the system is configured to:

add a binder from the binder source to the soil column; and mix the binder with the soil, lime, and carbon dioxide, wherein adding the binder to the soil in the soil column strengthens the treated soil in the soil column by reactions between the binder and the soil, lime, and carbon dioxide.

61. The system of any one of the clauses herein, further comprising a binder source, wherein the system is configured to:

add a binder comprising cement or a supplementary cementitious material from the binder source to the soil column; and mix the binder with the soil, lime, and carbon dioxide, wherein adding the binder to the soil in the soil column strengthens the treated soil in the soil column by reactions between the binder and the soil, lime, and carbon dioxide.

62. The system of any one of the clauses herein, further comprising a binder source including at least one of an accelerant, a water reducer, and/or an activator.

63. The system of any one of the clauses herein, further comprising a binder source including an admixture, wherein the admixture comprises a water reducer including a superplasticizer and/or synthetic polymer.

64. The system of any one of the clauses herein, further comprising a binder source including an admixture, wherein the admixture comprises an accelerant including a chloride, calcium chloride, sodium thiocyanate, and calcium formate, calcium nitrate, and/or calcium nitrite.

65. The system of any one of the clauses herein, further comprising a binder source including an accelerant, wherein the accelerant comprises at least one of calcium chloride, sodium thiocyanate, calcium formate, calcium nitrate, and/or calcium nitrite.

66. The system of any one of the clauses herein, further comprising a binder source including an admixture, wherein the admixture is a slurry.

67. The system of any one of the clauses herein, wherein adding lime and/or carbon dioxide to a soil column comprises:

adding the lime to the soil column; and after adding the lime, adding the carbon dioxide to the soil column including the lime, wherein soluble calcium ions of the lime react with the carbon dioxide.

68. The system of any one of the clauses herein, wherein adding lime and/or carbon dioxide to a soil column comprises:

adding the lime to the soil column;

after adding the lime, adding the carbon dioxide to the soil column including the lime; and enabling soluble calcium ions of the lime in the soil column to react with the carbon dioxide to form carbonic acid and/or calcium bicarbonate.

69. The system of any one of the clauses herein, wherein adding lime and/carbon dioxide to a soil column comprises:

adding the lime to the soil column;

after adding the lime, adding the carbon dioxide to the soil column including the lime; and enabling soluble calcium ions of the lime in the soil column to react with the carbon dioxide, by entrapping the carbon dioxide within the soil column.

70. The system of any one of the clauses herein, wherein adding lime and/carbon dioxide to a soil column comprises:

adding the lime to the soil column; and after adding the lime, adding the carbon dioxide to the soil column including the lime, wherein, in operation, the added carbon dioxide is sequestered via formation of calcium carbonate in the soil column.

71. The system of any one of the clauses herein, wherein the lime is quicklime, lime slurry, lime kiln dust or hydrated lime.

72. The system of any one of the clauses herein, wherein the lime is quicklime and the method comprises hydrating the quicklime to form hydrated lime.

73. The system of any one of the clauses herein, wherein the carbon dioxide comprises flue gas and/or compressed carbon dioxide.

74. The system of any one of the clauses herein, wherein the carbon dioxide is in a dissolved form of carbonic acid or bicarbonates.

75. The system of any one of the clauses herein, further comprising a binder source, wherein the system is configured to:

add a binder comprising a pozzolan from the binder source to the soil column; and mix the binder with the soil, lime, and carbon dioxide, wherein adding the binder to the soil in the soil column strengthens or stabilizes the treated soil in the soil column by reactions between the binder and the soil, lime, and carbon dioxide.

76. The system of any one of the clauses herein, wherein the system is further configured to strengthen the treated soil via pozzolanic reactions between calcium ions released from the lime and clay minerals of the soil.

77. The system of any one of the clauses herein, wherein:

the system is further configured to strengthen the treated soil, strengthening the treated soil occurs by pozzolanic reactions between calcium ions released from the lime and pozzolans of the soil, and the pozzolanic reactions include solubilizing alumina and silica present in the pozzolans and promoting formation of cementitious products through reaction between the lime and the pozzolans, wherein the cementitious products comprise calcium-silicate-hydrates and/or calcium-aluminate-hydrates.

78. The system of any one of the clauses herein, wherein a percentage of a combination of the lime and carbon dioxide to the binder compound is from 3-8 wt %.

79. The system of any one of the clauses herein, wherein an uptake of the carbon dioxide is 0.75 units per one unit of the calcium oxide.

80. The system of any one of the clauses herein, wherein the soil column is a closed system such that the carbon dioxide is inhibited from escaping.

81. The system of any one of the clauses herein, wherein the carbon dioxide is liquid carbon dioxide and is added to the soil column prior to adding the lime and/or the binder to the soil column.

82. The system of any one of the clauses herein, wherein the carbon dioxide and the lime are added to the soil column concurrently.

83. The system of any one of the clauses herein, wherein the apparatus includes a soil drill and the system is further configured to generate the soil column by penetrating a soil area with the soil drill to a predetermined depth, wherein adding the carbon dioxide includes injecting the carbon dioxide through the soil drill to the soil column while withdrawing the soil drill from the soil column subsequent to generating the soil column.

84. The system of any one of the clauses herein, wherein mineralizing the lime and carbon dioxide in the soil column is configured to enhance uptake of carbon dioxide relative to a soil column consisting of carbon dioxide and not lime.

85. The system of any one of the clauses herein, further comprising a water source fluidically coupled to the apparatus, wherein the apparatus is configured to add water from the water source to the soil column including the treated soil, lime, and carbon dioxide.

86. The system of any one of the clauses herein, wherein the lime comprises a lime slurry.

87. The system of any one of the clauses herein, wherein the carbon dioxide has a purity of at least 10%, 15%, 20%, 30%, 40%, 50%, 60%, 70%, 75%, 80%, 85%, 90%, or 95%.

88. The system of any one of the clauses herein, further comprising a cement source fluidically coupled to the apparatus, wherein the apparatus is configured to add cement from the cement source to form a mixture of cement, lime and carbon dioxide, and wherein the mixture includes at least 80%, 85%, 90% 93%, 94%, 95%, 96%, or 97% cement.

89. The system of any one of the clauses herein, further comprising a cement source fluidically coupled to the apparatus, wherein the apparatus is configured to add cement from the cement source to form a mixture of cement, lime and carbon dioxide, and wherein the mixture includes less than 5.2% lime, 1-5.2% lime, 1-4% lime, or 1.7-3.7% lime.

90. The system of any one of the clauses herein, further comprising a cement source fluidically coupled to the apparatus, wherein the apparatus is configured to add cement from the cement source to form a mixture of cement, lime and carbon dioxide, and wherein the mixture includes at least 1%, 1.1%, 1.2%, 1.3%, 1.5%, 1.7%, 2.0%, 2.3%, 2.5%, or 2.8% carbon dioxide.

91. The system of any one of the clauses herein, further comprising a cement source fluidically coupled to the apparatus, wherein the apparatus is configured to add cement from the cement source to form a mixture of cement, lime and carbon dioxide, and wherein the mixture includes 92-97% cement, 1.7-3.7% lime, and 1.3-2.8% carbon dioxide.

92. The system of any one of the clauses herein, further comprising a cement source fluidically coupled to the apparatus, wherein the apparatus is configured to add cement from the cement source to the soil column to form a mixture of cement, lime and carbon dioxide, and wherein the soil has a 28-day strength that is 1-20% higher than that of a non-treated soil.

93. The system of any one of the clauses herein, further comprising a cement source and a pozzolan source fluidically coupled to the apparatus, wherein the apparatus is configured to add cement from the cement source and a pozzolan from the pozzolan source to form a mixture of cement, pozzolan, lime, and carbon dioxide, and wherein the mixture includes 74-87% cement, 5.2-8.2% lime, 5-15% pozzolan, and up to 2.8% carbon dioxide.

94. The system of any one of the clauses herein, wherein the system is configured form treated soil by adding the lime and carbon dioxide, the treated soil having a 7-day strength that is 3-20% higher than that of a non-treated soil.

95. The system of any one of the clauses herein, wherein the system is configured form treated soil by adding the lime and carbon dioxide, the treated soil having a 28-day strength that is 5-20% higher than that of a non-treated soil.

96. The system of any one of the clauses herein, wherein the system is configured form treated soil by adding the lime and carbon dioxide, the treated soil having a carbon dioxide uptake that is increased by at least about 2% compared to a non-treated soil.

97. The system of any one of the clauses herein, wherein the soil column the lime and carbon dioxide are added to is at least 3, 4, 5, 6, 7, 8, 9, or 10 feet below a ground surface.

98. The system of any one of the clauses herein, further comprising a binder source fluidically coupled to the apparatus, wherein the apparatus is configured to:

add a binder comprising a pozzolan to the soil column;

mix the binder with the soil, lime, and carbon dioxide to form a mixture; and maintain a pH of the mixture of at least 10.

99. The system of any one of the clauses herein, wherein the apparatus includes a drill, and the apparatus is configured to:

generate the soil column by penetrating a soil area with a drill to a predetermined depth, wherein— adding the lime includes adding a slurry including the lime and a binder to the generated soil column, and the binder includes cement, supplementary cementitious material, pozzolan and/or a manufactured calcium carbonate product;

adding the carbon dioxide includes injecting the carbon dioxide through the drill to the soil column while withdrawing the soil drill from the soil column and/or subsequent to adding the slurry; and while withdrawing the soil drill from the soil column, mixing the carbon dioxide with the slurry in the soil column.

100. The system of any one of the clauses herein, wherein the apparatus includes a drill, and the apparatus is configured to:

generate the soil column by penetrating a soil area with a drill to a predetermined depth; add cement and/or supplemental cementitious material to the soil column while penetrating the soil area with the soil drill;

hydrate the cement and/or supplemental cementitious material in the soil column by adding water, wherein:

the hydrated cement and/or supplemental cementitious in the soil column has a first alkaline pH, adding the lime occurs after adding the cement and/or supplemental cementitious material and hydrating the cement, the mixture of cement and/or supplemental cementitious material and lime has a second pH of at least 12;

add a pozzolan comprising forms or oxides of silicon, aluminum, and iron to the soil column to form a mixture of pozzolan, cement and/or supplemental cementitious material, and lime, wherein— soluble calcium from the mixture reacts with active forms or oxides of silicon, aluminum, and iron of the pozzolan such that the mixture has a third pH that of at least 10, and adding the carbon dioxide includes injecting the carbon dioxide to the mixture while withdrawing the drill from the soil column.

101. The system of any one of the clauses herein, further comprising a binder source fluidically coupled to the apparatus, wherein the apparatus is configured to add a binder comprising a pozzolan from the binder source to the soil column, and the pozzolan has a median particle size no more than 50 μm, 45 μm, 40 μm, 35 μm or 32 μm.

102. The system of any one of the clauses herein, further comprising a binder source, wherein the system is configured to:

add a binder comprising a manufactured calcium carbonate product to the soil column from the binder source to the soil column; and mix the binder with the soil, lime, and carbon dioxide, wherein adding the binder to the soil in the soil column strengthens the treated soil in the soil column by reactions between the binder and the soil, lime, and carbon dioxide.

103. The system of any of the clauses herein, further comprising a cement source, a pozzolan source, and a manufactured calcium carbonate source, wherein the cement source, the pozzolan source and the manufactured lime source are each fluidically coupled to the apparatus, and wherein the apparatus is configured to add cement from the cement source, pozzolan from the pozzolan source and manufactured calcium carbonate from the manufactured calcium carbonate source to form a mixture including 35-50% cement, 3-9% lime, up to 15% pozzolan, 39-44% manufactured calcium carbonate, and up to 3% carbon dioxide.

104. The system of any of the clauses herein, further comprising a cement source, a pozzolan source, and a manufactured calcium carbonate source, wherein the cement source, the pozzolan source and the manufactured lime source are each fluidically coupled to the apparatus, and wherein the apparatus is configured to add cement from the cement source, pozzolan from the pozzolan source and manufactured calcium carbonate from the manufactured calcium carbonate source to form a mixture including up to 24% cement, 8-13% lime, 15-30% pozzolan, 50-55% manufactured calcium carbonate, and up to 3% carbon dioxide.

105. A system for sequestering carbon dioxide, comprising:

a mixing apparatus configured to:

mix lime with a first mixture comprising cement to form a second mixture, wherein the first mixture has an alkaline pH, and wherein the second mixture has a pH of at least 12.0 and soluble calcium cations;

mix a pozzolan with the second mixture to form a third mixture, wherein the pozzolan comprises a source of silicon, aluminum, and iron; and add carbon dioxide to the third mixture to form a fourth mixture.

106. The system of any one of the clauses herein, wherein the system is further configured to generate a soil column by penetrating a soil area with a drill, wherein adding the lime to the first mixture comprises adding the lime to the soil column containing the first mixture.

107. The system of any one of the clauses herein, wherein the system is further configured to generate a soil column by penetrating a soil area with a drill, wherein adding the lime to the first mixture comprises adding the lime to the soil column containing the first mixture, and wherein soil of the soil column comprises the pozzolan.

108. The system of any one of the clauses herein, wherein adding lime comprises adding quicklime and/or a lime slurry.

109. The system of any one of the clauses herein, wherein the pozzolan has a median particle size no more than 50 μm, 45 μm, 40 μm, 35 μm or 32 μm.

110. The system of any one of the clauses herein, wherein adding the carbon dioxide comprises adding carbon dioxide such that the pH remains above 11.0, 10.5, or 10.0.

111. The system of any one of the clauses herein, wherein adding the pozzolan causes the soluble calcium cations to react with forms or oxides of the silicon, aluminum, and/or iron to form nucleation sites.

112. The system of any one of the clauses herein, wherein adding the carbon dioxide causes the carbon dioxide to react with the soluble calcium cations to form calcium carbonate.

113. The system of any one of the clauses herein, wherein the fourth mixture has a density higher than that of the third mixture due to calcium carbonate of the fourth mixture formed by reactions between the carbon dioxide and the soluble calcium cations.

114. The system of any one of the clauses herein, wherein the fourth mixture has a calcium:silicon ratio of 0.5-0.8.

115. A method for storing and mineralizing carbon dioxide in soil, comprising:

adding a manufactured calcium carbonate product to a soil column to form treated soil; and after adding the manufactured calcium carbonate product, strengthening the treated soil in the soil column by mineralizing the manufactured calcium carbonate product.

116. A method for storing and mineralizing carbon dioxide in soil, comprising:

generating a soil column by penetrating a soil area with a drill to a predetermined depth;

adding cement and/or supplemental cementitious material to the soil column while penetrating the soil area with the soil drill;

hydrating the cement and/or supplemental cementitious material in the soil column by adding water; and adding a manufactured calcium carbonate product to the soil column to form a treated soil.

117. The method of any one of the clauses herein, further comprising adding a pozzolan comprising forms or oxides of silicon, aluminum, and iron to the soil column to form a mixture of pozzolan, cement and/or supplemental cementitious material, and lime, wherein soluble calcium from the mixture reacts with active forms or oxides of silicon, aluminum, and iron of the pozzolan such that the mixture has a pH of at least 10.

118. The method of any one of the clauses herein, wherein adding the manufactured calcium carbonate product includes injecting the manufactured calcium carbonate product to the mixture while withdrawing the drill from the soil column.

119. A system for storing and mineralizing carbon dioxide in soil, the system comprising:

a lime source;

a manufactured calcium carbonate product source; and an apparatus fluidically coupled to the lime source and the manufactured calcium carbonate product source, wherein the apparatus is configured to:

generate a soil column at a predetermined depth below a ground surface;

receive lime from the lime source;

receive manufactured calcium carbonate product from the manufactured calcium carbonate product source; and add the lime and manufactured calcium carbonate product to the soil column.

120. A composition for storing carbon dioxide in a soil column, the composition comprising:

35-50% of cement by weight of the composition;

1-10% of lime by weight of the composition;

up to 20% of a pozzolan by weight of the composition;

35-50% of calcium carbonate by weight of the composition; and up to 5% of carbon dioxide by weight of the composition.

121. The composition of any one of the clauses herein, wherein the calcium carbonate includes at least one of pulverized limestone, precipitated calcium carbonate, or manufactured calcium carbonate.

122. The composition of any one of the clauses herein, wherein the lime includes at least one of quicklime or a lime slurry.

123. The composition of any one of the clauses herein, wherein the pozzolan includes at least one of natural pozzolan, volcanic ash, calcined clay, silicate, aluminate, silica flume, bauxite residue, lithium slag, fly ash, ground granulated blast furnace slag or pozzolan slag.

124. The composition of any one of the clauses herein, wherein the composition is configured to be mixed with soil in the soil column and strengthen the soil in the soil column by mineralizing the lime and the carbon dioxide in the soil column.

125. The composition of any one of the clauses herein, further comprising soil.

126. The composition of any one of the clauses herein, wherein 100 kilograms to 300 kilograms of the composition is configured to be mixed with 1 cubic meter of soil in the soil column to strengthen the soil.

127. The composition of any one of the clauses herein, wherein soil treated with the composition has a 28-day strength that is greater or equal to 360 kilopascals.

128. The composition of any one of the clauses herein, wherein soil treated with the composition has an undrained shear strength that is greater or equal to 180 kilopascals after 28 days.

129. The composition of any one of the clauses herein, wherein the composition is further configured to be mixed with water, wherein a ratio of water to the composition is 0.5 to 1.

130. The composition of any one of the clauses herein, further comprising an admixture that comprises at least one of an accelerant, a water reducer, and/or an activator.

131. The composition of any one of the clauses herein, further comprising an admixture that comprises a water reducer including a superplasticizer and/or synthetic polymer.

132. The composition of any one of the clauses herein, further comprising an admixture that comprises an accelerant including a chloride, calcium chloride, sodium thiocyanate, and calcium formate, calcium nitrate, and/or calcium nitrite.

133. The composition of any one of the clauses herein, further comprising an admixture that comprises an accelerant including at least one of calcium chloride, sodium thiocyanate, calcium formate, calcium nitrate, and/or calcium nitrite.

134. The composition of any one of the clauses herein, further comprising an admixture, wherein the composition comprises no more than 10%, 8%, 6%, 4%, or 2% of the admixture.

135. The composition of any one of the clauses herein, further comprising an admixture that comprises a slurry.

136. A composition for storing carbon dioxide in a soil column, the composition comprising:

5-15% of lime by weight of the composition;

10-35% of a pozzolan by weight of the composition;

45-60% of calcium carbonate by weight of the composition; and up to 5% of carbon dioxide by weight of the composition.

137. The composition of any one of the clauses herein, further comprising up to 30% of cement by weight of the composition.

138. The composition of any one of the clauses herein, wherein the calcium carbonate includes at least one of pulverized limestone, precipitated calcium carbonate, or manufactured calcium carbonate.

139. The composition of any one of the clauses herein, wherein the lime includes at least one of quicklime or a lime slurry.

140. The composition of any one of the clauses herein, wherein the pozzolan includes at least one of natural pozzolan, volcanic ash, calcined clay, silicate, aluminate, silica flume, bauxite residue, lithium slag, fly ash, ground granulated blast furnace slag or pozzolan slag.

141. The composition of any one of the clauses herein, wherein the composition is configured to be mixed with soil in a soil column and strengthen the soil in the soil column by mineralizing the lime and the carbon dioxide in the soil column.

142. The composition of any one of the clauses herein, further comprising soil.

143. The composition of any one of the clauses herein, wherein 100 kilograms to 300 kilograms of the composition is configured to be mixed with 1 cubic meter of soil in the soil column to strengthen the soil.

144. The composition of any one of the clauses herein, wherein soil treated with the composition has a 28-day strength that is greater or equal to 360 kilopascals.

145. The composition of any one of the clauses herein, wherein soil treated with the composition has an undrained shear strength that is greater or equal to 180 kilopascals after 28 days.

146. The composition of any one of the clauses herein, wherein the composition is further configured to be mixed with water, wherein a ratio of water to the composition is 0.5 to 1.

147. A composition for storing carbon dioxide in a soil column, the composition comprising:

5-15% of lime by weight of the composition;

10-35% of a pozzolan by weight of the composition; and 45-60% of calcium carbonate by weight of the composition, wherein the composition is configured to be mixed with (i) soil in the soil column and (ii) up to 5% of carbon dioxide by weight of the composition to strengthen the soil in the soil column by mineralizing the lime and the carbon dioxide in the soil column.

148. A binder composition for storing carbon dioxide, the composition comprising:

5-30% of lime by weight;

45-90% of a supplementary cementitious material (SCM) by weight;

1-20% of calcium carbonate by weight; and up to 5% of carbon dioxide by weight.

149. The composition of any one of the clauses herein, wherein:

the lime comprises 10-15% by weight of the composition, the SCM comprises 65-90% by weight of the composition, and the calcium carbonate comprises 5-12% by weight of the composition.

150. The composition of any one of the clauses herein, wherein:

the lime comprises 20-30% by weight of the composition, the SCM comprises 45-65% by weight of the composition, and the calcium carbonate comprises 1-6% by weight of the composition.

151. The composition of any one of the clauses herein, wherein the lime comprises soluble calcium configured to mineralize at least some of the carbon dioxide into a functional calcium carbonate phase.

152. The composition of any one of the clauses herein, wherein the lime comprises soluble calcium configured to chemically activate the SCM and convert the SCM in water to cementitious calcium-silicate-hydrates and calcium-aluminate-hydrate phases.

153. The composition of any one of the clauses herein, wherein the lime and the carbon dioxide react to form calcium carbonate particles having a size distribution between 3-74 μm.

154. The composition of any one of the clauses herein, further comprising calcium carbonate particles having a size distribution between 3-74 μm.

155. The composition of any one of the clauses herein, further comprising up to 50% of cement by weight of the composition.

156. The composition of any one of the clauses herein, wherein the calcium carbonate includes at least one of pulverized limestone, precipitated calcium carbonate, or manufactured calcium carbonate.

157. The composition of any one of the clauses herein, wherein the lime includes at least one of quicklime, hydrated lime or a lime slurry.

158. The composition of any one of the clauses herein, wherein the SCM includes at least one of natural pozzolan, volcanic ash, calcined clay, silicate, aluminate, silica flume, bauxite residue, lithium slag, fly ash, ground granulated blast furnace slag or pozzolan slag.

159. The composition of any one of the clauses herein, wherein the SCM includes at least 70% of at least one of amorphous silicon dioxide, amorphous aluminum oxide, or amorphous iron oxide by weight.

160. The composition of any one of the clauses herein, wherein, when mixed with a soil in a soil column, the composition has a 28-day unconfined compressive strength of at least 360 kilopascals.

161. The composition of any one of the clauses herein, wherein the composition is mixed with the soil in the soil column at an application rate of 100-300 kilograms per cubic meter of soil volume.

162. The composition of any one of the clauses herein, wherein at least 90% of the SCM has a particle size of no more than 74 μm.

163. The composition of any one of the clauses herein, wherein at least 66% of the SCM has a particle size of no more than 45 μm.

164. The composition of any one of the clauses herein, wherein, when mixed with a soil in a soil column, the composition has an undrained shear strength that is greater or equal to 180 kilopascals after 28 days.

165. The composition of any one of the clauses herein, wherein, when mixed with a soil in a soil column, the composition has an undrained shear strength that is greater or equal to 250 megapascals after 28 days.

166. A composition, comprising:

35-50% of cement by weight of the composition;

1-15% of lime by weight of the composition;

5-30% of a supplementary cementitious material (SCM) by weight of the composition;

35-50% of calcium carbonate by weight of the composition; and up to 5% of carbon dioxide by weight of the composition.

167. The composition of any one of the clauses herein, wherein:

the calcium carbonate includes at least one of pulverized limestone, precipitated calcium carbonate, or manufactured calcium carbonate, the lime includes at least one of quicklime or a lime slurry, the SCM includes at least one of natural pozzolan, volcanic ash, calcined clay, silicate, aluminate, silica flume, bauxite residue, lithium slag, fly ash, ground granulated blast furnace slag or pozzolan slag.

168. The composition of any one of the clauses herein, wherein the composition is configured to (i) be mixed with soil in the soil column and (ii) strengthen the soil in the soil column by mineralizing the lime and the carbon dioxide in the soil column.

169. The composition of any one of the clauses herein, further comprising an admixture that comprises at least one of an accelerant, a water reducer, and/or an activator.

170. The composition of any one of the clauses herein, further comprising an admixture that comprises a water reducer including a superplasticizer and/or synthetic polymer.

171. The composition of any one of the clauses herein, further comprising an admixture that comprises an accelerant including a chloride, calcium chloride, sodium thiocyanate, and calcium formate, calcium nitrate, and/or calcium nitrite.

172. The composition of any one of the clauses herein, further comprising an admixture, wherein the composition comprises no more than 10%, 8%, 6%, 4%, or 2% of the admixture.

173. A method of sequestering carbon dioxide, the method comprising:

mixing lime with a first mixture comprising cement to form a second mixture, wherein the first mixture has an alkaline pH, and wherein the second mixture has a pH of at least 12.0 and soluble calcium cations;

mixing supplementary cementitious material (SCM) with the second mixture to form a third mixture, wherein the SCM comprises silicon, aluminum, and/or iron; and adding carbon dioxide to the third mixture to form a fourth mixture.

174. The method of any one of the clauses herein, further comprising mixing calcium carbonate with the second mixture along with the SCM to form the third mixture.

175. The method of any one of the clauses herein, further comprising mixing calcium carbonate with the second mixture separately from the SCM to form the third mixture.

176. The method of any one of the clauses herein, further comprising generating a soil column by penetrating a soil area with a drill, wherein adding the lime to the first mixture comprises adding the lime to the soil column containing the first mixture, and wherein soil of the soil column comprises the SCM.

177. The method of any one of the clauses herein, wherein the SCM has a median particle size no more than 50 μm.

178. The method of any one of the clauses herein, wherein adding the carbon dioxide comprises adding carbon dioxide such that the pH of the fourth mixture remains above 10.5.

179. The method of any one of the clauses herein, wherein the fourth mixture has a calcium:silicon ratio of 0.5-0.8 and a density higher than that of the third mixture.

We claim:

1. A binder composition for storing carbon dioxide, the composition comprising:

5-30% of lime by weight;

45-90% of a supplementary cementitious material (SCM) by weight;

1-20% of calcium carbonate by weight; and carbon dioxide.

2. The composition of claim 1, wherein:

the lime comprises 10-15% by weight of the composition, the SCM comprises 65-90% by weight of the composition, and the calcium carbonate comprises 5-12% by weight of the composition.

3. The composition of claim 1, wherein the calcium carbonate includes at least one of pulverized limestone, precipitated calcium carbonate, or manufactured calcium carbonate.

4. The composition of claim 1, wherein the lime includes at least one of quicklime, hydrated lime or a lime slurry.

5. The composition of claim 1, wherein the SCM includes at least one of natural pozzolan, volcanic ash, calcined clay, silicate, aluminate, silica fume, bauxite residue, lithium slag, fly ash, ground granulated blast furnace slag or pozzolan slag.

6. The composition of claim 1, wherein, when mixed with a soil in a soil column, the composition has a 28-day unconfined compressive strength of at least 360 kilopascals.

7. The composition of claim 1, wherein, when mixed with a soil in a soil column, the composition has an undrained shear strength that is greater or equal to 180 kilopascals after 28 days.

8. The composition of claim 1, wherein the SCM includes silicate and/or aluminate.

9. The composition of claim 1, wherein the calcium carbonate includes precipitated calcium carbonate.

10. A binder composition for storing carbon dioxide, the composition comprising:

5-30% of lime by weight;

at least 45% of a supplementary cementitious material (SCM) by weight;

1-20% of calcium carbonate by weight; and carbon dioxide.

11. A method of sequestering carbon dioxide, the method comprising:

mixing lime with a first mixture comprising cement to form a second mixture, wherein the first mixture has an alkaline pH, and wherein the second mixture has a pH of at least 12.0 and soluble calcium cations;

mixing a supplementary cementitious material (SCM) with the second mixture to form a third mixture, wherein the SCM comprises silicon, aluminum, and/or iron; and adding carbon dioxide to the third mixture to form a fourth mixture comprising—

5-30% of lime by weight;

at least 45% of a supplementary cementitious material (SCM) by weight;

1-20% of calcium carbonate by weight; and carbon dioxide.

12. The method of claim 11, wherein the calcium carbonate of the fourth mixture comprises at least one of pulverized limestone, precipitated calcium carbonate, or manufactured calcium carbonate.

13. The method of claim 11, wherein the SCM of the fourth mixture comprises at least one of natural pozzolan, volcanic ash, calcined clay, silicate, or aluminate.

14. The method of claim 11, further comprising mixing the fourth mixture in a soil column, where the fourth mixture has a 28-day unconfined compressive strength of at least 360 kilopascals.

15. The method of claim 11, further comprising mixing the fourth mixture in a soil column, where the fourth composition has an undrained shear strength that is greater or equal to 180 kilopascals after 28 days.

* * * * *

UNITED STATES PATENT AND TRADEMARK OFFICE

CERTIFICATE OF CORRECTION

PATENT NO. : 12,122,722 B2
APPLICATION NO. : 18/390399
DATED : October 22, 2024
INVENTOR(S) : Narain Hariharan et al.

It is certified that error appears in the above-identified patent and that said Letters Patent is hereby corrected as shown below:

On the Title Page

On Page 2, Column 2, item (56) Other Publications, Line 23, delete "Decarbonating:;aCO3" and insert --Decarbonating CaCO3-- therefor.

On Page 3, Column 2, item (56) Other Publications, Line 1, delete "Silicate Silicate" and insert --Silicate-- therefor.

In the Specification

In Column 5, Detailed Descriptions, Line 25, delete "flume," and insert --fume,-- therefor.

In Column 6, Detailed Descriptions, Line 37, delete ""DI" and insert --D1-- therefor.

In Column 6, Detailed Descriptions, Line 41, delete ""DI" and insert --D1-- therefor.

In Column 6, Detailed Descriptions, Line 46, delete "212" and insert --202-- therefor.

In Column 14, Detailed Descriptions, Line 38, delete "I" and insert --1-- therefor.

In Column 27, Detailed Descriptions, Line 37, delete "flume," and insert --fume,-- therefor.

In Column 28, Detailed Descriptions, Line 37, delete "flume," and insert --fume,-- therefor.

In Column 29, Detailed Descriptions, Line 53, delete "flume," and insert --fume,-- therefor.

In Column 30, Detailed Descriptions, Line 31, delete "flume," and insert --fume,-- therefor.

Signed and Sealed this
Twenty-fourth Day of June, 2025

Coke Morgan Stewart
*Acting Director of the United States Patent and Trademark Office*

In the Claims

In Column 32, Claim 11, Line 26, delete “comprising—” and insert --comprising:-- therefor.